(12) United States Patent
Carlen et al.

(10) Patent No.: US 8,610,714 B2
(45) Date of Patent: Dec. 17, 2013

(54) SYSTEMS, METHODS, AND COMPUTER-READABLE MEDIA FOR MANIPULATING GRAPHICAL OBJECTS

(75) Inventors: Conrad R. Carlen, Burlingame, CA (US); Samir B. Gehani, Cupertino, CA (US); Matthew Jacob Sarnoff, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 541 days.

(21) Appl. No.: 12/907,810

(22) Filed: Oct. 19, 2010

(65) Prior Publication Data

US 2012/0092340 A1 Apr. 19, 2012

(51) Int. Cl.
*G06T 17/00* (2006.01)

(52) U.S. Cl.
USPC .......... 345/420; 345/419; 345/672; 715/702; 715/727; 715/753

(58) Field of Classification Search
USPC .......... 345/420, 672, 419; 715/702, 727, 753
See application file for complete search history.

(56) References Cited

U.S. PATENT DOCUMENTS

| | | | |
|---|---|---|---|
| 6,512,522 B1 | 1/2003 | Miller et al. | |
| 7,046,241 B2 | 5/2006 | Arvin | |
| 7,652,670 B2 | 1/2010 | Styles | |
| 2003/0058246 A1* | 3/2003 | Roelofs | 345/467 |
| 2007/0030266 A1* | 2/2007 | Styles | 345/420 |
| 2009/0184980 A1 | 7/2009 | Mansfield | |
| 2010/0211368 A1* | 8/2010 | Grinspun et al. | 703/6 |
| 2011/0016004 A1* | 1/2011 | Loyall et al. | 705/14.72 |
| 2011/0055703 A1* | 3/2011 | Lundback et al. | 715/727 |
| 2011/0055729 A1* | 3/2011 | Mason et al. | 715/753 |

FOREIGN PATENT DOCUMENTS

JP 09-198223 A 7/1997

OTHER PUBLICATIONS

David Stotts, "3D Sliders: Programming Uses for 3D Object Warping in Collaborative Virtual Environments" Department of Computer Science, University of North Carolina at Chapel Hill, Technical Report TR02-030, Jun. 1, 2002, pp. 1-9.

Bruce H. Thomas, et al., "Experiments with Animating Direct Manipulation in a Drawing Editor" Advanced Computing Research Centre, School of Computer and Information Science, University of South Australia; Department of Computer Science, Flinders University; and Land, Space and Optoelectronics Division, Defence Science and Technology Organisation, 1998, pp. 1-8.

(Continued)

*Primary Examiner* — Kimbinh T Nguyen
(74) *Attorney, Agent, or Firm* — Wong, Cabello, Lutsch, Rutherford & Brucculeri, LLP

(57) ABSTRACT

Systems, methods, and computer-readable media for manipulating graphical objects are provided. For example, a polygonal mesh may be modeled based on graphical object content, and then both a graphical object based on the graphical object content and a map of control points based on the polygonal mesh may be rendered on a display. A user may activate one or more of the displayed control points and may provide one or more user movements to reposition the activated control points. The polygonal mesh may be physically simulated in response to the user movements of the control points, and then the graphical object and the map of control points may be re-rendered based on the physical simulation of the polygonal mesh. The graphical object content may include multiple character glyphs of a text string, and the polygonal mesh for that content may include one or more intra-character polygons per character glyph.

31 Claims, 13 Drawing Sheets

(56) References Cited

OTHER PUBLICATIONS

Thomas Jakobsen, "Advanced Character Physics" Gamasutra.com, http://www.gamasutra.com/resource_guide/20030121/jacobson_pfv.htm, Jan. 21, 2003, pp. 1-18.

Jetro Lauha, "Gentle Introduction to Physics in Games and Demos" Seminar presentation, Assembly Jul. 28-31, 2005, pp. 1-27.

"NETGEN—automatic mesh generator" http://www.hpfem.jku.at/netgen/, Oct. 6, 2010, p. 1.

"Application Programming Interface" Wikipedia.org, http://en.wikipedia.org/wiki/Application_programming_interface, Oct. 6, 2010, pp. 1-7.

* cited by examiner

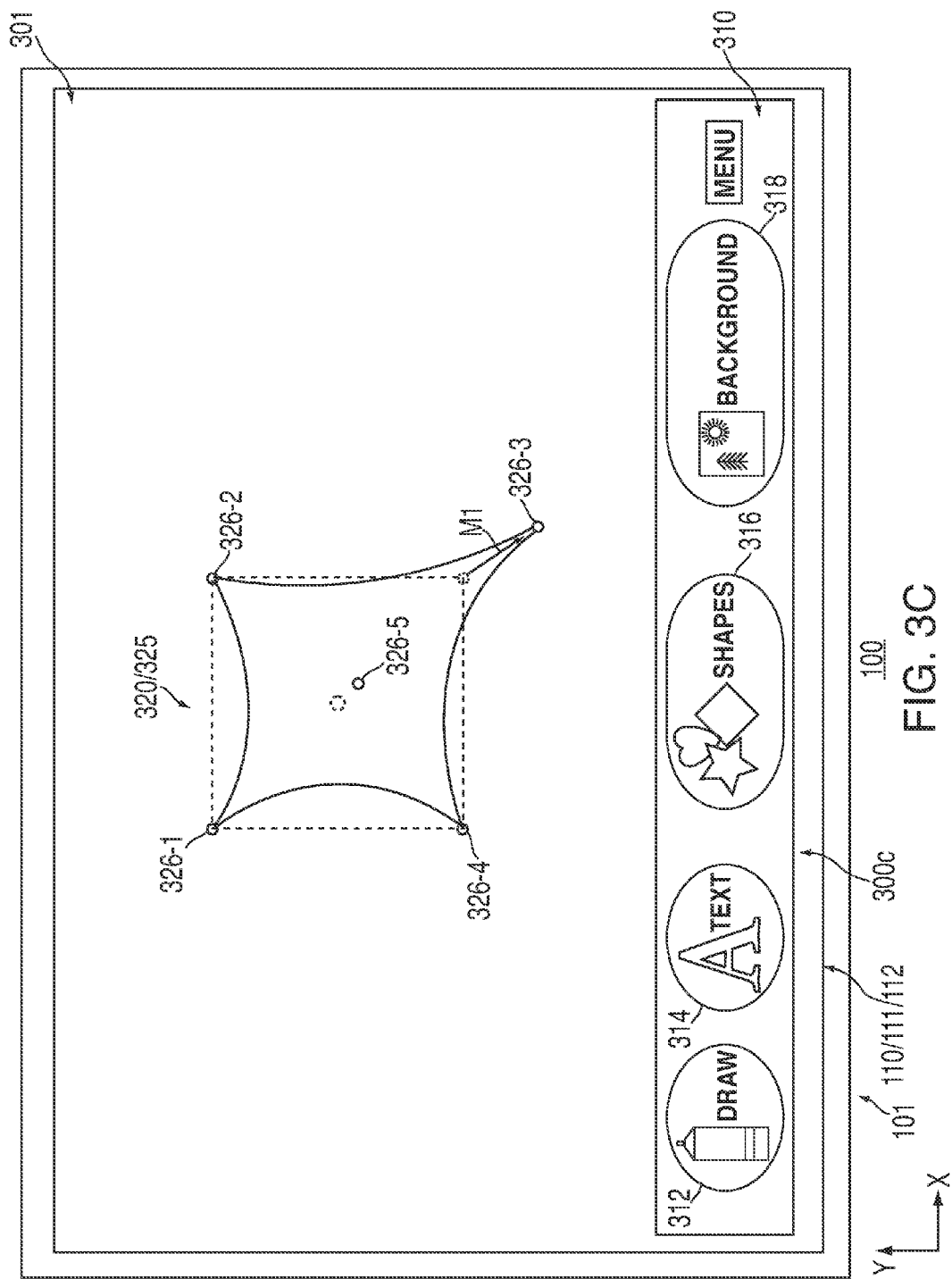

SYSTEMS, METHODS, AND COMPUTER-READABLE MEDIA FOR MANIPULATING GRAPHICAL OBJECTS

FIELD OF THE INVENTION

This can relate to systems, methods, and computer-readable media for processing graphical data and, more particularly, to systems, methods, and computer-readable media for manipulating graphical objects using an electronic device.

BACKGROUND OF THE DISCLOSURE

Some electronic devices include a graphical display system for generating and presenting graphical objects, such as strings of text and drawing shapes, on a display. A user of such devices may interact with the graphical display system via a user interface to move a displayed graphical object to different positions on the display. However, currently available electronic devices may limit the ways by which a user may move certain portions of a displayed graphical object on a display relative to certain other portions of the displayed graphical object.

SUMMARY OF THE DISCLOSURE

Systems, methods, and computer-readable media for manipulating graphical objects are provided.

For example, in some embodiments, there is provided a method for manipulating graphical data. The method may include modeling a polygonal mesh based on graphical object content, and then rendering on a display both a graphical object based on the graphical object content and a map of control points based on the polygonal mesh. The method may also include receiving activation information for at least one control point of the map and receiving movement information. Then, the method may include physically simulating the polygonal mesh based on the activation information and the movement information, and re-rendering on the display both the graphical object and the map of control points based on the physical simulation of the polygonal mesh.

In some embodiments, the polygonal mesh may include a first number of vertices, the control map may include a second number of control points, and each control point of the map may be associated with a respective vertex of the polygonal mesh. However, the second number may be at least one less than the first number, such that at least one vertex may not be associated with a control point of the map. In some embodiments, the method may also include receiving fixation information for at least one other control point of the map, and the physical simulation may be conducted based on the activation information, the movement information, and the fixation information. This physical simulation may employ a Verlet integration scheme or any other suitable integration scheme. In some particular embodiments, the reception of activation information may include receiving a first user touch gesture at a first position on the display that may be associated with the at least one control point, and the reception of movement information may include receiving a second user touch gesture that may move from the first position on the display to a second position on the display. Accordingly, in some embodiments, the physical simulation and the re-rendering may be continually repeated as the second user gesture moves on the display screen.

In other embodiments, there is provided a method for manipulating graphical data that may include generating graphical object content. The graphical object content may include a first character glyph and a second character glyph of a text string. The method may also include modeling a polygonal mesh based on the graphical object content, and then rendering on a display both a graphical object based on the graphical object content and a map of control points based on the polygonal mesh.

For example, in some embodiments, the polygonal mesh may be modeled by generating a first intra-character polygon for the first character glyph, generating a second intra-character polygon for the second character glyph, and generating a first inter-character polygon between the first intra-character polygon and the second intra-character polygon. For example, the first intra-character polygon and the second intra-character polygon may share a common vertex, the first inner-character polygon and the first intra-character polygon may share two common vertices, while the first inner-character polygon and the second intra-character polygon may share two common vertices. In other embodiments, the polygonal mesh may be modeled with respect to a baseline typographical bound and an ascent typographical bound. For example, each intra-character polygon may include two baseline vertices and an ascent vertex, and one of the two baseline vertices of each of intra-character polygon may be a common baseline vertex to both intra-character polygons. Moreover, the first inner-character polygon may include the common baseline vertex of both intra-character polygons as well as the ascent vertex of each intra-character polygon. Each polygon may include a set of constraints, and each constraint of each intra-character polygon may be rigid, while a constraint of the first inner-character polygon may be non-rigid. In such embodiments, each polygon may include a set of vertices, while a common vertex may be shared by the first intra-character polygon, the second intra-character polygon, and the first inner-character polygon. The non-rigid constraint of the first inner-character polygon may prevent a constraint of the first intra-character polygon from overlapping with a constraint of the second intra-character polygon when the graphical object is manipulated. The polygonal mesh may include multiple vertices and each vertex may be associated with a respective one of the control points.

In other embodiments, there is provided a method that may include presenting for display on a virtual drawing space a graphical object that may include multiple control points, each of which may be moveable between and anchorable to coordinates on the virtual drawing space. The method may also include simultaneously accepting a first user input for moving a first control point to a first user-designated coordinate and a second user input for moving a second control point to a second user-designated coordinate. Then, in response to the user inputs, the method may also include simultaneously moving the first control point along the virtual drawing space to the first user-designated coordinate, the second control point along the virtual drawing space to the second user-designated coordinate, and at least some of the other control points along the virtual drawing space in an inertial manner. For example, the first user input and the second user input may be simultaneously received from a multi-touch input component. In some embodiments, the first user input and the second user input may be simultaneously received by moving a virtual user input tool along the virtual drawing space in a single direction. In some embodiments, the method may also include anchoring the first control point at the first user-designated coordinate.

In still yet other embodiments, there is provided a graphical display system. The system may include a polygonal modeling module that may generate a collection of polygons based on graphical object content, and a rendering module that may render a graphical object on a display based on the graphical object content and that may render at least two control points on the display based on the collection of polygons. The system may also include a hit detecting module that may receive activation information for each of the at least two control points, and a movement detecting module that may receive movement information. The system may also include a physical simulation integrating module that may physically simulate the collection of polygons based on the activation information and the movement information.

For example, in some embodiments, the system may also include a re-rendering module that may re-render the graphical object and the at least two control points based on the physically simulated collection of polygons. A multi-touch input component may also be included, such that the hit detecting module may simultaneously receive the activation information for each of the at least two control points from the multi-touch input component. Similarly, the movement detecting module may receive the movement information from the multi-touch input component. The graphical object content may include a first character glyph and a second character glyph of a text string. In other embodiments, the graphical object content may include a boundary of a drawing shape.

In still yet other embodiments, there is provided computer-readable media for controlling an electronic device. The media may include computer-readable code recorded thereon for generating graphical object content that may include a first character glyph and a second character glyph of a text string. The media may also include computer-readable code recorded thereon for modeling a polygonal mesh based on the graphical object content by generating a first intra-character polygon for the first character glyph, generating a second intra-character polygon for the second character glyph, and generating a first inter-character polygon between the first intra-character polygon and the second intra-character polygon. The media may also include computer-readable code recorded thereon for rendering on a display both a graphical object based on the graphical object content and a map of control points based on the polygonal mesh. In some embodiments, each polygon may include at least three vertices, and each control point may be associated with a respective vertex.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which:

FIGS. 3A-3H are front views of the electronic device of FIGS. 1 and 2, presenting exemplary screens of displayed graphical data, in accordance with some embodiments of the invention.

DETAILED DESCRIPTION OF THE DISCLOSURE

Systems, methods, and computer-readable media for manipulating graphical objects are provided and described with reference to FIGS. 1-6.

Figure 1:
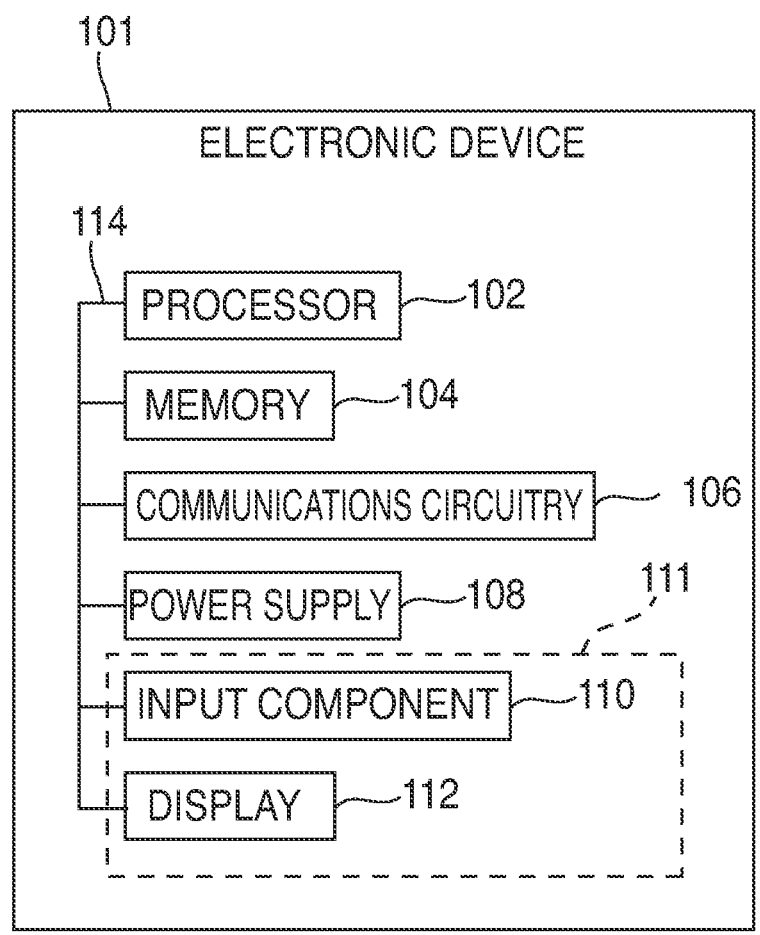
FIG. 1 is a schematic view of an illustrative electronic device for manipulating graphical objects, in accordance with some embodiments of the invention.

FIG. 1 is a schematic view of an illustrative electronic device 100 for manipulating graphical objects in accordance with some embodiments of the invention. Electronic device 100 may be any portable, mobile, or hand-held electronic device configured to manipulate graphical objects wherever the user travels. Alternatively, electronic device 100 may not be portable at all, but may instead be generally stationary. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 100 may perform a single function (e.g., a device dedicated to manipulating graphical objects) and, in other embodiments, electronic device 100 may perform multiple functions (e.g., a device that manipulates graphical objects, plays music, and receives and transmits telephone calls).

Electronic device 100 may include a processor or control circuitry 102, memory 104, communications circuitry 106, power supply 108, input component 110, and display 112. Electronic device 100 may also include a bus 114 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 1. For example, electronic device 100 may include motion-sensing circuitry, a compass, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a host computer or an accessory device) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, proximity sensor, light detector, motion sensors, and combinations thereof. Each input component 110 can be configured to provide one or more dedicated control functions for making selections or issuing commands associated with operating device 100.

Electronic device 100 may also include one or more output components that may present information (e.g., graphical, audible, and/or tactile information) to a user of device 100. An output component of electronic device 100 may take various forms, including, but not limited to, audio speakers, headphones, audio line-outs, visual displays, antennas, infrared ports, rumblers, vibrators, or combinations thereof.

For example, electronic device 100 may include display 112 as an output component. Display 112 may include any suitable type of display or interface for presenting visual data to a user. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera.

In some embodiments, display 112 may include display driver circuitry, circuitry for driving display drivers, or both. Display 112 can be operative to display content (e.g., media playback information, application screens for applications implemented on electronic device 100, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components and one or more output components may sometimes be referred to collectively herein as an input/output ("I/O") component or I/O interface (e.g., input component 110 and display 112 as I/O component or I/O interface 111). For example, input component 110 and display 112 may sometimes be a single I/O component 111, such as a touch screen, that may receive input information through a user's touch of a display screen and that may also provide visual information to a user via that same display screen.

Processor 102 of device 100 may include any processing circuitry operative to control the operations and performance of one or more components of electronic device 100. For example, processor 102 may be used to run operating system applications, firmware applications, media playback applications, media editing applications, or any other application. In some embodiments, processor 102 may receive input signals from input component 110 and/or drive output signals through display 112. Processor 102 may load a user interface program (e.g., a program stored in memory 104 or another device or server) to determine how instructions or data received via an input component 110 may manipulate the way in which information is stored and/or provided to the user via an output component (e.g., display 112). Electronic device 100 (e.g., processor 102, memory 104, or any other components available to device 100) may be configured to process graphical data at various resolutions, frequencies, intensities, and various other characteristics as may be appropriate for the capabilities and resources of device 100.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
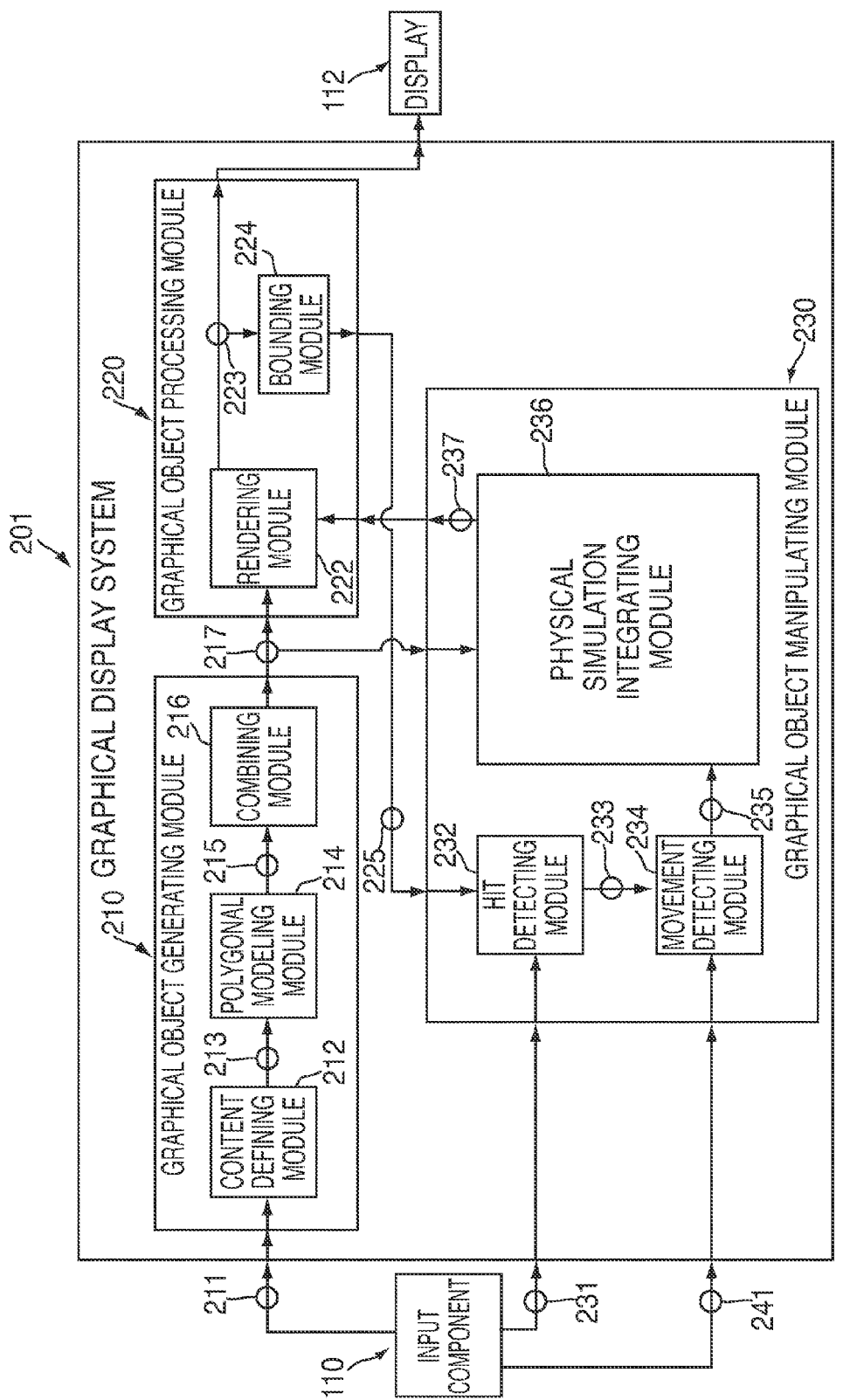
FIG. 2 is a schematic view of an illustrative portion of the electronic device of FIG. 1, in accordance with some embodiments of the invention.

FIG. 2 shows a schematic view of a graphical display system 201 of electronic device 100 that may be provided to generate and manipulate graphical data for presentation on display 112. For example, in some embodiments, graphical display system 201 may generate and manipulate graphical data representations of two-dimensional and/or three-dimensional objects that may define at least a portion of a visual screen of information to be presented as an image on a display, such as display 112. Graphical display system 201 may be configured to generate and manipulate realistic animated images in real time (e.g., using about 30 or more screens or frames per second) for presentation to a user on display 112.

As shown in FIG. 2, for example, graphical display system 201 may include a graphical object generating module 210 that may define and generate at least a portion of the graphical contents of each of the screens to be rendered for display. Such graphical screen contents may be based on the one or more applications being run by electronic device 100 as well as any input instructions being received by device 100 (e.g., via input component 110). The graphical screen contents can include video data based on images of a video program, background image content (e.g., photographic images), textual information (e.g., one or more alphanumeric characters), drawing objects, and combinations thereof. For example, an application run by electronic device 100 may be any suitable application that may provide a virtual drawing space on which a user may create and manipulate graphical objects, such as text strings, drawing shapes, and free-form strokes (e.g., Illustrator™ or Photoshop™ by Adobe Systems Incorporated or Microsoft Paint™ by Microsoft Corporation). Graphical object generating module 210 may define and generate at least some of these types of graphical objects to be rendered for display by graphical display system 201. For example, graphical object generating module 210 may generate text string graphical objects and drawing shape graphical objects to be rendered for display by graphical display system 201 on display 112 of electronic device 100.

In some embodiments, graphical object generating module 210 may include a content defining module 212. Content defining module 212 may receive input information 211 from various input sources for defining the content of a graphical object to be generated. For example, such input sources may be the one or more applications being run by electronic device 100 and/or any input instructions being received by device 100 (e.g., via input component 110, as shown in FIG. 2).

When graphical object generating module 210 is generating a text string graphical object, content defining module 212 may receive various types of text string input information 211, such as a selection of one or more characters, as well as a selection of one or more properties that may be used to define various characteristics of the selected characters. For example, a text string character may be a letter, number, punctuation, or other symbol that may be used in the written form of one or more languages. Symbol characters may include, but are not limited to, representations from a variety of categories, such as mathematics, astrology, astronomy, chess, dice, ideology, musicology, economics, politics, religion, warning signs, meteorology, and the like. A property that may be used to define a characteristic of a text string character may include, but is not limited to, a font type (e.g., Arial or Courier), a character size, a style type (e.g., bold or italic), a color, and the like. In some embodiments, a user of device 100 may select each character and each property of each character that may be used by content defining module 212 to define a text string graphical object. For example, a user may interact with one or more text applications running on device 100 via input component 110. In other embodiments, an application running on device 100 may be configured to select one or more characters and/or character properties that may be used by content defining module 212 to define a text string graphical object.

Once text string input information 211 has been received, content defining module 212 may generate appropriate graphical object content 213, such as a glyph for each selected character based on its associated selected properties. Each text string character of each combination of properties can be represented by a different glyph, and each glyph can be defined using any suitable approach. In some embodiments, a glyph can be defined using an 8-bit bitmap that may be associated with one or more particular character properties. In another embodiment, a glyph can be defined using path data that may be associated with a particular character and a particular font property but that can be resized based on the selected size property. In some embodiments, content defining module 212 may include or may have access to a glyph repository or database that may have stored therein glyphs for some or all characters and some or all properties, and content defining module 212 may select particular glyphs from the glyph database in response to received text string input information 211. In some embodiments, content defining module 212 may generate the appropriate glyphs in response to received text string input information 211.

When graphical object generating module 210 is generating a drawing shape graphical object, content defining module 212 may receive various types of drawing shape input information 211, such as a selection of a pre-defined shape (e.g., a box, a star, a heart, etc.) or a free-form drawing input indicative of a user-defined shape. In some embodiments, a user of device 100 may select a pre-defined shape from a list of shapes made available by an application running on device 100. Alternatively, a user may interact with an application to define the closed boundary of a user-defined shape. For example, a user may interact with one or more drawing applications running on device 100 via input component 110. Once drawing shape input information 211 has been received, content defining module 212 may generate appropriate graphical object content 213, such as an appropriate boundary representation of the selected drawing shape.

In some embodiments, graphical object generating module 210 may include a polygonal modeling module 214 for receiving graphical object content 213. Based on the received graphical object content 213 defined and generated by content defining module 212 for a particular graphical object (e.g., one or more character glyphs for a particular text string graphical object, or a boundary representation for a particular drawing shape graphical object), polygonal modeling module 214 may generate a polygonal mesh 215 for the received graphical object content 213. Polygonal mesh 215 may include a collection of one or more polygons that may represent or approximate the shape of the received graphical object content 213. Polygonal modeling module 214 may compute and generate a polygonal mesh 215 for graphical object content 213 "on the fly" in response to receiving the particular graphical object content 213 from content defining module 212. Additionally or alternatively, in some embodiments, some or all possible graphical object content 213 that may be received by polygonal modeling module 214 may be pre-defined, such that some or all respective types of polygonal meshes 215 may also be pre-defined and stored on device 100 or otherwise made accessible to polygonal modeling module 214 in a polygonal mesh database, such that polygonal modeling module 214 may select the appropriate polygonal mesh 215 from the database in response to receiving particular graphical object content 213. Such a polygonal mesh database may be generated by any suitable mesh generator, such as the NETGEN mesh generator. In some embodiments, polygonal modeling module 214 may be provided to graphical display system 201 through an application programming interface ("API") of device 100.

A basic element of a polygonal mesh 215 that may be generated or otherwise provided by polygonal modeling module 214 may be a vertex (e.g., a point in two- or three-dimensional space). Two vertices coupled by a straight line may define an edge, while three vertices coupled to each other by three edges may define a triangle, which may be the simplest polygon (e.g., in Euclidean space). Polygons more complex than a triangle may be provided by polygonal modeling module 214 out of multiple triangles, or as a single object with more than three vertices, such as a four sided polygon, which may generally be referred to as a quad. A group of two or more polygons, which may be coupled to each other by one or more shared vertices, may generally be referred to as an element, while each of the polygons that make up an element may be called a face. The number of polygons, their configuration, and the manner in which they may be coupled to one another in a polygonal mesh 215 provided by polygonal modeling module 214 may vary based on the geometry and type of the graphical object content 213 received from content defining module 212. For example, the granularity or resolution of a polygonal mesh 215 (e.g., the number of polygons that may be used to approximate a shape of graphical object content 213) may be determined on a case by case basis and may be high enough such that a curved surface of the graphical object may appear sufficiently smooth when represented by the polygonal mesh. For example, a NETGEN mesh generator may use three or four subdivision iterations to approximate a shape of a graphical object. Moreover, the complexity of each polygon of mesh 215 may vary. For example, some of the polygons may be triangles and others may be quads. Polygons of a certain complexity may vary in size, or all polygons of a certain complexity may have the same size. For example, polygonal modeling module 214 may subdivide one or more shapes of the graphical object content 213 into a collection of polygons for approximating the one or more shapes.

As described in more detail below, the vertices of a polygonal mesh 215 may be physically simulated as distinct masses (e.g., particles with mass) that may be linked by physical constraints (e.g., rigid struts, or flexible springs, or inequality constraints that can enforce at least a minimum and/or a maximum distance between two vertices). For example, the physical simulation may provide for the animation of inertial distortion of an associated displayed graphical object when it is manipulated by a user. The attributes of each vertex and the attributes of its relationship to any other vertex coupled thereto (e.g., its mass, the flexibility or rigidity of each of its constraints, a minimum and/or a maximum distance to be ensured between two vertices, a minimum or maximum size of an angle to be ensured as formed by two constraints at a common vertex, and the like) may be determined by polygonal modeling module 214 and/or by a physical simulation integrating module that may physically simulate polygonal mesh 215. The determination of these attributes may be based on any suitable information, such as the type of graphical object that mesh 215 was modeled on, the application being run by device 100, user preferences, and the like.

Graphical object generating module 210 may include a combining module 216 that may combine the graphical object content 213 defined by content defining module 212 with the associated polygonal mesh 215 provided by polygonal modeling module 214 to define modeled graphical object content 217 for a particular graphical object to be displayed. For example, in some embodiments, a polygonal mesh 215 may be generated and defined by polygonal modeling module 214 (e.g., a NETGEN mesh generator) to include various elements. For example, a polygonal mesh 215 may include a list of vertices of the mesh and their (x,y) positions, or their (x,y,z) positions if provided as a three-dimensional mesh. Moreover, a polygonal mesh 215 may be defined to include a list describing how its vertices may be interconnected. For example, this may be defined in terms of edges (e.g., pairs (i,j), where i and j may be indices of coupled vertices of the defined list of vertices) or triangles (e.g., triples (i,j,k), where i, j, and k may be vertex indices). A polygonal mesh 215 may also be defined to include an indication of which vertices are "external" vertices of the graphical object (e.g., which vertices are modeled to approximate, and are positioned along, a perimeter or outer surface of the graphical object). If the graphical object content, and thus its associated mesh, is a two-dimensional object, it may be sufficient to use a "fill polygon" function of graphical display system 201 or of the operating system of device 100 generally, for example, by using coordinates of the external vertices (e.g., as designated by the defined mesh 215) as parameters for the fill function. However, if the graphical object content, and thus its associated mesh, is a three-dimensional object, more information may need to be provided as part of the definition of mesh 215. For example, additional information indicative of which polygons of the mesh represent outer surfaces of the mesh (e.g., as provided by a NETGEN mesh generator), as well as information indicative of the vertices and/or surface normal vectors of these polygons, may be utilized to define mesh 215.

As shown in FIG. 2, for example, graphical display system 201 may also include a graphical object processing module 220 that may process the graphical object information generated by graphical object generating module 210 (e.g., modeled graphical object content 217) such that the graphical object may be presented to a user on display 112 of device 100. In some embodiments, as shown in FIG. 2, for example, graphical object processing module 220 may include a rendering module 222. Rendering module 222 may be configured to render the graphical screen content information for the graphical object information generated by graphical object generating module 210, and may therefore be configured to provide rendered graphical object data 223. For example, rendering module 222 may be configured to perform various types of graphics computations or processing techniques and/or implement various rendering algorithms on the graphical object information generated by graphical object generating module 210 so that rendering module 222 may render the graphical data necessary to define at least a portion of the image to be displayed on display 112 (e.g., the graphical object portion of the image). Such processing may include, but is not limited to, matrix transformations, scan-conversions, various rasterization techniques, various techniques for three-dimensional vertices and/or three-dimensional primitives, texture blending, and the like.

Rendered graphical object data 223 may include one or more sets of pixel data, each of which may be associated with a respective pixel to be displayed by display 112 when presenting a graphical object portion of that particular screen's visual image to a user of device 100. For example, each of the sets of pixel data included in rendered graphical object data 223 generated by rendering module 222 may be correlated with coordinate values that identify a particular one of the pixels to be displayed by display 112, and each pixel data set may include a color value for its particular pixel as well as any additional information that may be used to appropriately shade or provide other cosmetic features for its particular pixel. A portion of this pixel data of rendered graphical object data 223 may represent at least a portion of the graphical object content 213 of the modeled graphical object content 217 for a particular graphical object (e.g., one or more glyphs of a text string graphical object or a boundary representation of a drawing shape graphical object). In some embodiments, a portion of this pixel data of rendered graphical object data 223 may also represent at least a portion of the polygonal mesh 215 of the modeled graphical object content 217 for the particular graphical object (e.g., one or more polygonal vertices and/or one or more polygonal edges).

Rendering module 222 may be configured to transmit the pixel data sets of rendered graphical object data 223 for a particular screen to display 112 via any suitable process for presentation to a user. Moreover, rendering module 222 may transmit rendered graphical object data 223 to a bounding module 224 of graphical object processing module 220. Based on graphical object data 223, bounding module 224 may generate bounding area information 225 that may be indicative of one or more particular areas of the screen presented by display 112. For example, bounding area information 225 may be indicative of the particular pixel area of a display screen that is presenting the entire graphical object content 213 of rendered graphical object data 223 (e.g., such that system 201 may know what area of the screen may need to be re-rendered if the object is manipulated). Alternatively or additionally, bounding area information 225 may be indicative of the particular pixel area of a display screen that is presenting a particular portion of the displayed graphical object. For example, bounding area information 225 may be indicative of the particular pixel area of a display screen that is presenting a particular portion of polygonal mesh 215 of the modeled graphical object content 217 (e.g., the particular pixel area of a display screen that is presenting a particular vertex of the polygonal mesh 215). This bounding area information 225 may be compared with user input information indicative of a user interaction with a displayed graphical object. Such a comparison may help determine with which particular portion of the graphical object the user is intending to interact.

An illustrative example of how graphical display system 201 may generate and display graphical object content to a user may be described with reference to FIGS. 3A-3H.

FIGS. 3A-3H, for example, show electronic device 100 with housing 101 and display 112 presenting respective exemplary screens 300a-300h of visual information. As shown, display 112 may be combined with input component 110 to provide an I/O interface component 111, such as a touch screen. At least a portion of the visual information of each one of screens 300a-300h may be generated by graphical object generating module 210 and processed by graphical object processing module 220 of graphical display system 201. As shown, screens 300a-300h may present an interface for a virtual drawing space application of device 100, with which a user may create and manipulate graphical objects for making original works of art (e.g., a virtual drawing space application that may be similar to that of Photoshop™ or Illustrator™ by Adobe Systems Incorporated or Microsoft Paint™ by Microsoft Corporation). It is to be understood, however, that screens 300a-300h are merely exemplary, and display 112 may present any images representing any type of graphical objects and/or graphical object animation that may be generated and processed by graphical display system 201.

For example, as shown in FIGS. 3A-3H, a virtual drawing space application may provide a canvas area 301 on a portion of the screen in which various graphical objects may be positioned. The application may also provide on a portion of the screen an artist menu 310. Menu 310 may include one or more graphical input options that a user may choose from to create various types of graphical objects in canvas area 301. For example, as shown, artist menu 310 may include a free-form stroke or drawing input option 312, which a user may select for creating free-form strokes in canvas area 301, such as paint brush strokes, pencil strokes, and the like, by moving a user-controlled virtual artistic tool along a desired path in canvas area 301. Artist menu 310 may also include a text string input option 314, which a user may select for creating strings of characters in canvas area 301. Artist menu 310 may also include a drawing shape input option 316, which a user may select for creating various drawing shapes in canvas area 301. Moreover, artist menu 310 may also include a background image option 318, which a user may select for importing video-based or photographic images into canvas area 301.

It is to be understood, however, that options 312-318 of artist menu 310 are merely exemplary, and a virtual drawing space application may provide various other types of artist input options that a user may work with for creating content in canvas area 301.

Figure 3A:
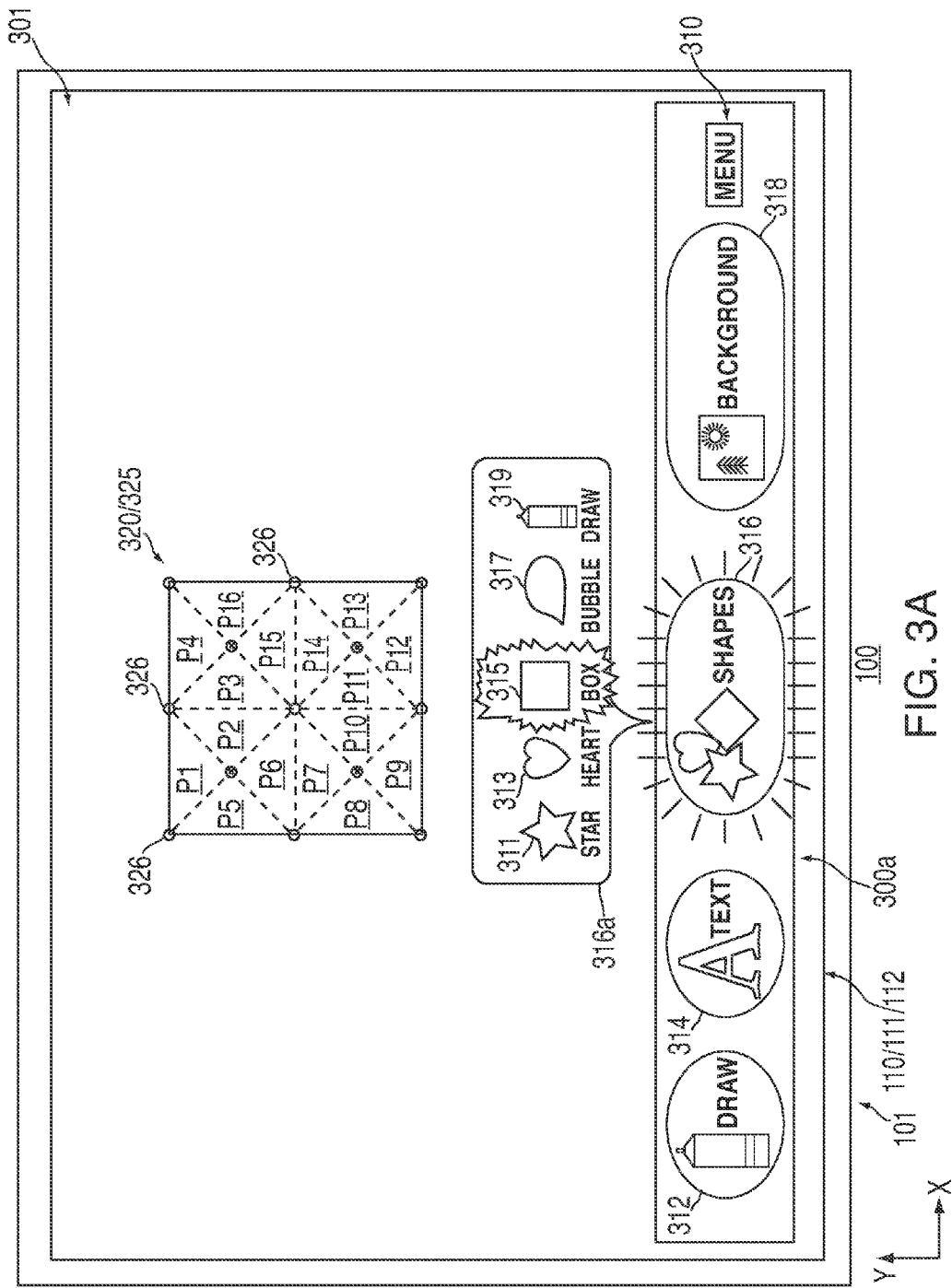

As shown by screen 300a of FIG. 3A, for example, a user may select drawing shape input option 316 of artist menu 310 for creating various drawing shapes in canvas area 301. When a user selects drawing shape input option 316, a sub-menu 316a of the application may be displayed that can provide the user with one or more different types of drawing shapes that may be created in canvas area 301. For example, drawing shape sub-menu 316a may allow the user to select a drawing shape from a group of various pre-defined drawing shapes, such as with a drawing shape input sub-option 311 for creating a star-shaped drawing shape, a drawing shape input sub-option 313 for creating a heart-shaped drawing shape, a drawing shape input sub-option 315 for creating a box-shaped drawing shape, and a drawing shape input sub-option 317 for creating a bubble-shaped drawing shape. Additionally or alternatively, drawing shape sub-menu 316a may allow the user to create a user-defined shape, such as with a drawing shape input sub-option 319 for allowing the user to free-form draw in canvas 301 to define the boundary of a user-defined drawing shape. It is to be understood that additional pre-defined drawing shapes as well as other drawing shape input options, such as an option to select the color or initial size of a drawing shape, may also be provided by drawing shape input option 316 of artist menu 310. Any selections made by the user with respect to the options provided by drawing shape input option 316 may be received by graphical display system 201 for generating and displaying drawing shape graphical object content in canvas area 301. For example, selections made by the user with respect to the options provided by drawing shape input option 316 may be received by content defining module 212 of graphical object generating module 210 as drawing shape input information 211.

When a user selects drawing shape input sub-option 315 for creating a box-shaped drawing shape, for example, the selection may be received by content defining module 212 as drawing shape input information 211, and content defining module 212 may generate an appropriate box-shaped boundary representation as graphical object content 213. This content 213 may be processed by rendering module 222 to generate at least a portion of rendered graphical object data 223 with pixel data that may represent that box-shaped boundary representation content 213, and that boundary representation pixel data may be presented on display 112 at a particular position in canvas area 301. For example, as also shown by screen 300a of FIG. 3A, in response to a user selecting drawing shape input sub-option 315 for creating a box-shaped drawing shape, graphical display system 201 may generate and present box-shaped drawing shape graphical object 320 in canvas area 301 of display 112.

The initial position of drawing shape graphical object 320 in canvas area 301 may be determined in any suitable way. For example, the user may select a portion of the canvas where drawing shape graphical object 320 should be initially positioned. Alternatively, the virtual drawing space application may automatically determine the initial position of new graphical object 320, which may be done based on other content already existing in canvas area 301 or based on a pre-defined initial position for the selection made by the user.

Moreover, in addition to generating and rendering box-shaped boundary representation content 213 for displaying box-shaped drawing shape graphical object 320, graphical display system 201 may also generate a polygonal mesh 215 based on that content 213. In some embodiments, at least a portion of that polygonal mesh 215 may be processed by rendering module 222 to generate a portion of rendered graphical object data 223 with pixel data that may represent that polygonal mesh 215. That polygonal mesh pixel data may be presented on display 112 as a map of one or more control points at one or more appropriate positions in canvas area 301 with respect to its associated graphical object 320. For example, as also shown by screen 300*a* of FIG. 3A, in response to a user selecting drawing shape input sub-option 315 for creating a box-shaped drawing shape, graphical display system 201 may generate and present a box-shaped drawing shape control point map 325 in canvas area 301 of display 112 along with associated box-shaped drawing shape graphical object 320. Control point map 325 may include a collection of control points, each of which may be representative of a respective vertex of its associated polygonal mesh 215. In some embodiments, each vertex of the polygonal mesh 215 may be represented by a respective control point of control point map 325. Alternatively, only certain vertices of a polygonal mesh 215 may be represented by respective control points of map 325.

As mentioned, the number of polygons and the manner in which they may be arranged and coupled to one another in a polygonal mesh 215 provided by polygonal modeling module 214 may vary based on the geometry and type of the graphical object content 213 received from content defining module 212. For example, with respect to the polygonal mesh 215 represented by control point map 325 for the graphical object content 213 represented by graphical object 320, as shown in FIG. 3A, sixteen polygons P1-P16 may be generated by polygonal modeling module 214. Polygons P1-P16 may be coupled to one another by thirteen vertices, such that control point map 325 may include thirteen respective control points 326. It is to be understood, however, that the granularity of polygons for box-shaped graphical object 320 (e.g., the number of polygons used to subdivide object 320) may be more or less than sixteen, and the number of vertices may be more or less than thirteen. For example, in some embodiments, when a polygonal mesh 215 is modeled for any general drawing shape, a value (e.g., $\epsilon$) may be defined to represent the length of the longest visually acceptable straight line segment that may be presented on display 112 (e.g., 5 or 10 units or pixels in the display's coordinate space). Then, the original drawing shape may be defined as a sequence of connected line segments or as a closed Bezier curve, in which case such a curve may be approximated as a sequence of line segments (e.g., using recursive subdivision or any other suitable method), until the length of all such segments is less than or equal to defined value $\epsilon$. A mesh generating algorithm may then partition or subdivide the internal area of the shape defined by these line segments into a collection of polygons, a process which may be repeated until the length of each edge of each of the polygons is less than or equal to E. It is also to be understood that, although some of the sides or edges of some of polygons P1-P16 of mesh 215 may be shown by hatched lines in FIG. 3A, in some embodiments only the vertices of mesh 215 may actually be presented by rendered graphical object data 223 on display 112, for example, as control points 326 of map 325.

Moreover, as mentioned, only certain vertices of mesh 215 for a particular graphical object may actually be presented to a user as visible control points on a displayed graphical object. For example, as opposed to displaying all thirteen vertices of mesh 215 with thirteen respective control points 326, as shown in FIG. 3A, graphical display system 201 may only display control points for a select subset of the polygonal mesh vertices. As shown by screen 300*b* of FIG. 3B, for example, only five control points 326 for five of the thirteen vertices of mesh 215 may actually be presented to a user on displayed box-shaped drawing shape graphical object 320.

Figure 3B:
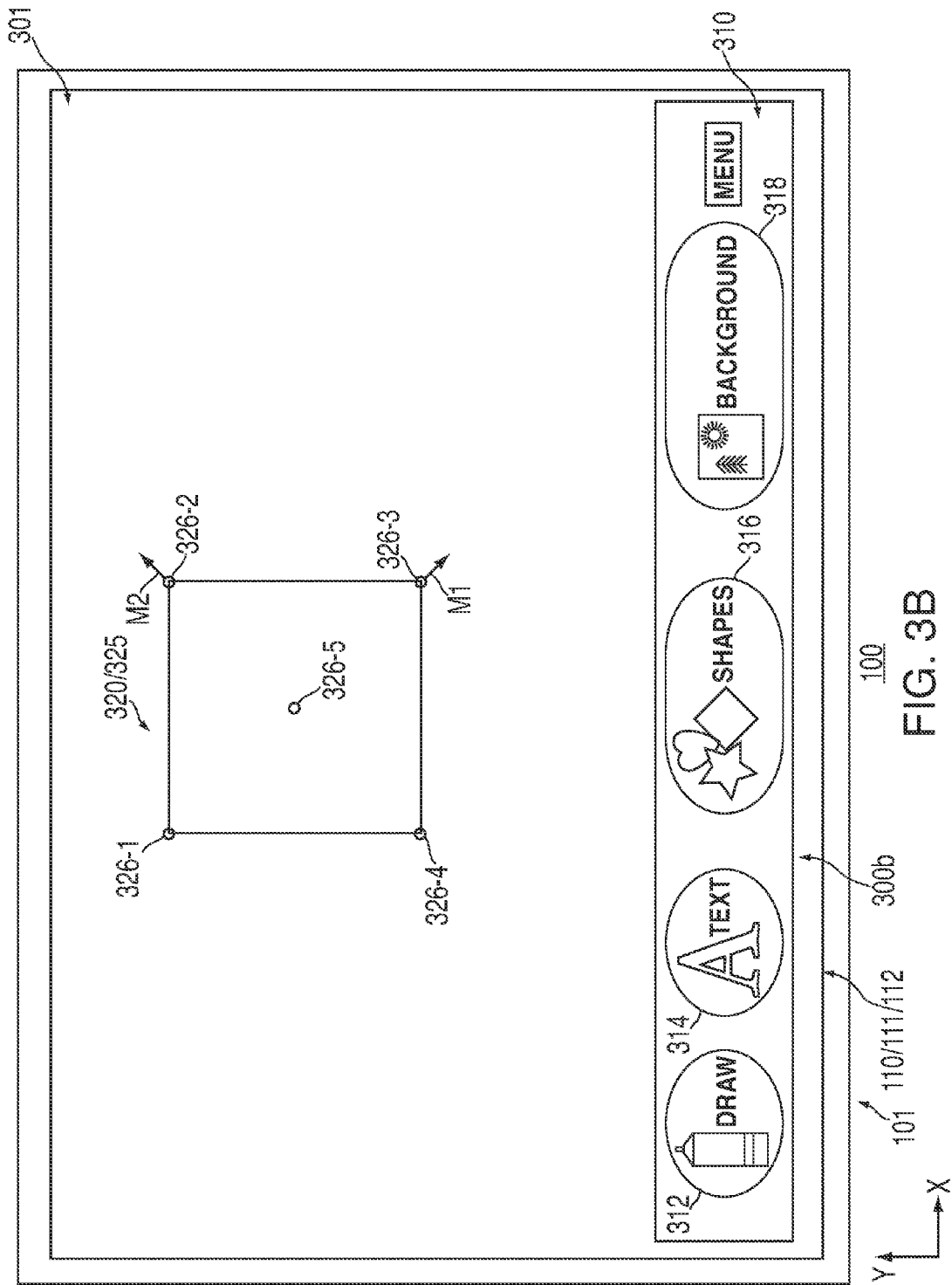

Graphical display system 201 may be configured to render for display only those control points of a map that correspond to particular vertices of a polygonal mesh 215. For example, only the vertices that correspond to particular portions of a graphical object may be displayed as control points. In some embodiments, graphical display system 201 may be configured to display control points for the mesh vertices that are proximal to the boundary of a drawing shape graphical object (e.g., the vertices modeled to match an edge portion of the graphical object) but not for the mesh vertices positioned within the boundary of the drawing shape. In some embodiments, graphical display system 201 may be configured to display control points for the mesh vertices that are not only proximal to the boundary of the drawing shape but that are also proximal to portions of the boundary of the drawing shape that are the least linear. For example, as shown in FIG. 3B, control points 326 may only be displayed for the vertices proximal to the boundary of box-shaped graphical object 320 that are also at distinct corners of the box (e.g., upper-left control point 326-1, upper-right control point 326-2, lower-right control point 326-3, and lower-left control point 326-4). Alternatively or additionally, in some embodiments, graphical display system 201 may be configured to display control points for the mesh vertices within the boundary of the drawing shape graphical object, such as the mesh vertex proximal to a position that may be determined to be the barycenter or the center of gravity or the center of mass of the drawing shape. For example, as shown in FIG. 3B, a control point 326-5 may be provided for the vertex most proximal to the center of box-shaped graphical object 320. In some embodiments, the set of control points to be rendered may be predefined by a process of polygonal modeling module 214 or any other suitable module of graphical display system 201 or any application running on device 100. In some embodiments, no control points may be rendered for display of the graphical object, such that the user may selectively activate one or more portions of the graphical object without specific reference to one or more specific control points. For example, a user may simply indicate one or more particular portions of a displayed graphical object to be selectively activated for movement or to be selectively anchored to canvas 301 (e.g., by pointing, clicking, or otherwise indicating one or more portions of the displayed graphical object, such as with an input component 110, as described with respect to input hit information 231 below). System 201 may identify one or more vertices or edges of mesh 215 associated with the identified portion(s) of the displayed object. In some embodiments, for example, system 201 may identify one or more polygonal edges or vertices of mesh 215 that may be most closely associated to the identified portion(s) of the displayed graphical object, which may be accomplished using any suitable algorithms and threshold distance settings. The one or more identified vertices and/or edges may then be activated or anchored with respect to manipulation of the displayed graphical object, despite some or none of those vertices or edges being represented by rendered control points on canvas 301.

Once a particular graphical object type has been selected (e.g., a box-shaped drawing shape), and once graphical display system 201 has generated and rendered both a corresponding graphical object and at least a subset of the polygonal mesh vertices associated with that graphical object as control points on canvas 301 of display 112, graphical display system 201 may provide the user with the ability to manipulate the displayed graphical object in various ways. For example, a user may interact with one or more of the displayed control points of a displayed graphical object to manipulate the presentation of the graphical object in various ways. In some embodiments, a user may select one or more control points to be actively moved by the user for manipulating the shape and position of a graphical object in canvas 301. Additionally or alternatively, in some embodiments, a user may select one or more control points to be anchored or fixed in place at a position or coordinate on canvas 301 before actively moving one or more other control points to one or more new positions or coordinates, such that the user may have more command over the ways in which the shape and position of a graphical object may be manipulated. As mentioned, the vertices of a polygonal mesh 215 may be physically simulated as distinct masses with various types of constraints therebetween. Therefore, by providing the user with the ability to move one or more vertices of a graphical object with respect to one or more other vertices of the graphical object (e.g., via interaction with respective control points), graphical display system 201 may provide for the animation of inertial distortion of a displayed graphical object when it is manipulated by a user.

As shown in FIG. 2, for example, graphical display system 201 may also include a graphical object manipulating module 230, which may detect a user's interaction with a displayed graphical object and then generate a manipulated version of the graphical object based on the detected user interaction. Graphical object manipulating module 230 may include a hit detecting module 232, which may determine the status of a user's interaction with one or more control points or other elements of a displayed graphical object. For example, hit detecting module 232 may receive user hit information 231 that may be indicative of a user's selection of one or more control points to be fixed in place on canvas 301 and/or a user's selection of one or more control points to be actively moved and repositioned on canvas 301.

As shown in FIG. 2, for example, input component 110 may provide hit detecting module 232 with user hit information 231, which may be indicative of a particular type of user interaction with a displayed graphical object. In some embodiments, user hit information 231 may be indicative of a user's selection of a particular portion of a displayed graphical object for dictating its eventual movement or non-movement. For example, when box-shaped graphical object 320 and a set of five control points 326 are displayed on canvas 301, as shown in FIG. 3B, a user may be able to interact with at least six distinct portions of displayed graphical object 320. The user may be able to interact with each of the five displayed control points 326, for example, either to selectively fix the control point to canvas 301 in order to prevent future movement of that control point on canvas 301 or to selectively activate the control point for active future movement of the control point on canvas 301. By neither selectively fixing nor selectively activating a particular control point, any future movement of that control point may be dictated by the movement and/or non-movement of other control points. Moreover, the user may be able to interact with a non-control point portion of displayed graphical object 320 to selectively activate the entire object for active future movement of the entire object on canvas 301. Each one of these user interactions may generate user hit information 231 and may be accomplished by the user providing one or more particular types of input with respect to one or more particular distinct portions of a displayed graphical object using one or more input components 110.

A user may point to or otherwise attempt to identify one or more particular distinct portions of a displayed graphical object on display 112 using any suitable input component 110, such as a mouse or touch screen, and may then submit one or more particular input commands for generating user hit information 231 with respect to each of the one or more particular distinct portions of the displayed graphical object. For example, a user may double-click a mouse input component or double-tap a touch screen input component at a particular displayed control point to selectively fix that control point to canvas 301 in order to prevent future movement of that control point on canvas 301. As another example, a user may press and hold an input component at a particular displayed control point to selectively activate that control point for active future movement on canvas 301. As yet another example, a user may press and hold an input component at a non-control point portion of a displayed graphical object to selectively activate that entire object for active future movement on canvas 301 (e.g., such that all vertices may be moved in unison for changing the position of the entire graphical object on canvas 301, but such that no portion of the graphical object's shape may be distorted). It is to be understood that any suitable input component may be used to point to or otherwise identify a particular portion of a displayed graphical object and any suitable input gesture of that input component may be used to interact with that particular portion in any particular way.

Once suitable user hit information 231 is provided by input component 110, hit detecting module 232 may compare that user hit information with known position information of particular portions of a displayed graphical object. For example, as described above, bounding area information 225 generated by bounding module 224 of graphical object processing module 220 may be compared with user input information indicative of a user interaction with a displayed graphical object, and such a comparison may help determine with which particular portion of the graphical object the user is intending to interact. Therefore, in some embodiments, hit detecting module 232 may compare user hit information 231 with bounding area information 225 to determine which portion of a displayed graphical object the user is intending to interact with (e.g., one or more control points or a non-control point portion of the graphical object).

Based on this determination, hit detecting module 232 may generate graphical object hit information 233. This graphical object hit information 233 may be indicative of a user-selected status for each control point of a displayed graphical object with respect to any future movement or non-movement of the graphical object. For example, graphical object hit information 233 may define which of the displayed graphical object's control points have been selectively fixed to canvas 301 and, thus, which control points may be prevented from moving in response to any future movement of another portion of the graphical object. Additionally or alternatively, graphical object hit information 233 may define which of the displayed graphical object's control points have been selectively activated and, thus, which control points may be actively moved in response to future movement of the graphical object. Additionally or alternatively, graphical object hit information 233 may define which of the displayed graphical object's control points have been neither selectively fixed nor selectively activated and, thus, which control points may be passively moved in response to future movement of other control points of the graphical object. Alternatively, graphical object hit information 233 may indicate that a non-control point portion of the displayed graphical object has been selectively activated and, thus, that all control points may be actively moved in response to future movement of the graphical object.

As shown in FIG. 2, graphical object manipulating module 230 may also include a movement detecting module 234, which may compare and/or combine this graphical object hit information 233 with any received indication from a user of a desire to move the displayed graphical object. For example, in some embodiments, movement detecting module 234 may receive user movement information 241, which may be indicative of a user's desire to move the displayed graphical object on canvas 301 in one or more particular directions. In some embodiments, as shown in FIG. 2, for example, input component 110 may provide movement detecting module 234 with user movement information 241. Once a graphical object and one or more associated control points have been displayed on canvas 301 by graphical processing module 220, and once hit detecting module 232 has determined which, if any, of the displayed control points have been selectively fixed or activated, graphical object manipulating module 230 may allow a user to interact with the displayed graphical object on canvas 301 to indicate one or more directions of movement along which the user may want to manipulate the graphical object. User movement information 241 may be indicative of such one or more directions. In some embodiments, rather than just being indicative of one or more directions, user movement information 241 may be indicative of one or more motion vectors (e.g., a Euclidean vector) that may be representative of both one or more directions of movement as well as one or more respective magnitudes of movement.

For example, any suitable input component 110 may be configured to generate user movement information 241. A user may point to or otherwise identify at least a first distinct position on display 112 using any suitable pointing input component 110, such as a mouse or touch screen, and may then drag or otherwise move the input component to at least a second distinct position on display 112. In some embodiments, a motion vector may be formed between the first position and second position that may be indicative of at least a particular direction and a respective particular magnitude of movement that may be provided to movement detecting module 234 as user movement information 241 (e.g., the length of the distance between the two positions may be associated with a magnitude and the angle formed by the vector with respect to a reference position may be associated with a direction). In some embodiments, the speed with which the user moves from the first position to the second position may define a portion of a motion vector. When one or more selectively activated vertices or other portions of a graphical object are being actively moved by a user, one or more "motion events" may be triggered by graphical display system 201 (e.g., about 60 times a second, although any other suitable frequency may be used to refresh/update the presentation of the object on canvas 301). For example, when a motion event is received, the position of each activated graphical object portion may be instantaneously updated to its current position (e.g., as determined by the current position of a user's motion, such as indicated by user movement information 241). The simulation of mesh 215 may then be updated accordingly, such that a difference vector between the new and previous positions of the activated graphical object portion may be used to propagate forces to neighboring portions of the graphical object (e.g., one or more vertices), which may thereby cause stretching and/or various other distortion or physically simulated effects. As an example, at least a portion of the motion of a user's movement of a graphical object may be used implicitly. That is, the velocity or speed of a user's movement from one position to another may not be explicitly calculated and used as a controlling input of a physical simulation. Instead, in some embodiments, the new vertex position may be used as such an input and may be compared (e.g., by the physical simulator or other portion of graphical display system 201) to its previous position, and such a comparison may be used to implicitly compute the velocity of the vertex as a difference in position over a period of time.

In some embodiments, a virtual movement tool (e.g., a cursor or user touch) of any particular shape may be provided on display 112 and controlled by an input component 110, and the shape of the virtual movement tool may be manipulated to identify and selectively alter the status of one or more control points as well as to generate one or more user movements for one or more of the identified control points. For example, when interacting with a multi-touch input component, different simultaneous touch inputs may selective change the status of different control points in different ways to collectively generate user hit information 231, and then different simultaneous user movements may be imparted by at least some of the different touch inputs to collectively generate user movement information 241. It is to be understood that any suitable input component 110 may be used to identify one or more particular positions on a display screen and any suitable input gesture of that input component may be used to indicate one or more particular directions or motion vectors of movement with respect to those one or more particular positions.

Once suitable user movement information 241 has been provided by input component 110, movement detecting module 234 may compare and/or combine that user movement information with known graphical object hit information 233. For example, as described above, graphical object hit information 233 may be indicative of a user-selected status for each control point of a displayed graphical object with respect to any future movement or non-movement of the graphical object. Therefore, in some embodiments, movement detecting module 234 may compare and/or combine user movement information 241 with graphical object hit information 233 to determine which control points of a displayed graphical object may be actively and/or passively moved as well as the direction along which they are to be moved.

Based on this determination, movement detecting module 234 may generate graphical object movement information 235. This graphical object movement information 235 may be indicative of not only the initial position and user-selected status for each control point of a displayed graphical object, but also one or more user-generated movements (e.g., one or more user-generated directions or motion vectors) with which the control points are to be moved in accordance with their status. For example, in some embodiments, graphical object movement information 235 may indicate that a first movement of user movement information 241 may be associated with a first particular control point of user hit information 231 and that a second movement of user movement information 241 may be associated with a second particular control point of user hit information 231. In some embodiments, graphical object movement information 235 may indicate that a first movement of user movement information 241 may be associated with more than one particular control point of user hit information 231 and that a second movement of user movement information 241 may be associated with yet other particular control points of user hit information 231.

As shown in FIG. 2, for example, graphical object manipulating module 230 may include a physical simulation integrating module 236. In some embodiments, physical simulation integrating module 236 may receive graphical object movement information 235 as well as modeled graphical object content 217. Physical simulation integrating module 236 may be configured to physically simulate the polygonal mesh 215 of a displayed graphical object in accordance with one or more integration schemes and in response to graphical object movement information 235. Therefore, a physical simulation of a polygonal mesh 215 may be based not only on the initial position of each vertex and/or control point, but also on the user-selected status for each control point, as well as on the one or more user-generated movements (e.g., one or more user-generated directions or motion vectors) with which one or more of the control points are to be moved in accordance with their status. Physical simulation integrating module 236 may use some or all of this information to physically simulate the polygonal mesh vertices of a graphical object as distinct masses with constraints therebetween in order to determine how the graphical object may be manipulated in response to the user-selected status for each control point and the one or more user-generated movements. Based on this determination, physical simulation integrating module 236 may generate manipulated modeled graphical object content 237. This manipulated modeled graphical object content 237 may then be provided to rendering module 222 for generating updated rendered graphical object data 223 and, thus, for updating the display of the graphical object in accordance with the physical simulation. Moreover, bounding module 224 may update bounding area information 225 based on updated rendered graphical object data 223 and the new position of one or more of the graphical object's control points on canvas 301. In some embodiments, the new position of one or more of the graphical object's control points may be fixed on canvas 301 until new user hit information 231 and/or new user movement information 241 is received by graphical display system 201. Therefore, the physical simulation of graphical display system 201 may provide for the physically simulated animation of a displayed graphical object when it is manipulated by a user. However, as mentioned, in some embodiments, when a user selectively activates a non-control point portion of a displayed graphical object using a first particular input gesture, such as a click and hold gesture (e.g., as may be indicated by particular user hit information 231), the entire object may be selectively activated for active future movement on canvas 301 (e.g., such that all vertices/control points may be selectively activated and moved in unison for changing the position of the entire graphical object on canvas 301 but such that no portion of the graphical object's shape may be distorted). Therefore, such hit information 231 may indicate that graphical display system 201 may bypass physical simulation integrating module 236, and the entire graphical object may be re-rendered in accordance with such hit information 231 and its associated user movement information 241 to re-position the entire graphical object on canvas 301. Additionally or alternatively, in some embodiments, when a user selectively activates a non-control point portion of a displayed graphical object using a second particular input gesture, such as a double-click gesture (e.g., as may be indicated by particular user hit information 231), the entire object may be selectively activated for immediate movement back to their original un-distorted positions (e.g., such that all vertices may be selectively activated but independently manipulated back to their original positions of FIG. 3B). Therefore, such hit information 231 may indicate that graphical display system 201 may utilize physical simulation integrating module 236 to simulate each control point returning to its original position in accordance with such hit information 231, but without the need for any associated movement information 241.

As mentioned, the attributes of each vertex of a polygonal mesh 215 and the attributes of each vertex's relationship to any other vertex coupled thereto (e.g., its mass, the flexibility or rigidity of each of its constraints, a minimum and/or a maximum distance to be ensured between two vertices, a minimum or maximum size of an angle to be ensured as formed by two constraints at a common vertex, and the like) may be determined by polygonal modeling module 214 and/or by physical simulation integrating module 236. The determination of these attributes may be based on any suitable information, such as the type of graphical object that mesh 215 was modeled on, the application being run by device 100, user preferences, the one or more integration schemes that may be employed for the physical simulation, and the like. Moreover, these determined attributes of a graphical object's polygonal mesh may affect the ways in which the graphical object is physically simulated during manipulation of the object. For example, in some embodiments, physical simulation integrating module 236 may employ a Verlet integration scheme or any other suitable integration scheme, such as those described in the publication entitled "Advanced Character Physics", by Thomas Jakobsen, of Jan. 21, 2003, which is hereby incorporated by reference herein in its entirety. It is to be understood that any other suitable integration scheme or combination of suitable integration schemes may be employed by physical simulation integrating module 236 to physically simulate a graphical object in accordance with the various attributes of its polygonal mesh.

This physically-based modeling and simulation of a graphical object may not only provide for more ways in which a user many manipulate the graphical object, but may also provide for a more realistic graphical object interface with which the user may interact. For example, based on certain attributes of its polygonal mesh, if a user drags a displayed graphical object by a particular control point (e.g., a control point positioned at a corner of the object), the object may be slightly distorted as if it had inertia. If a user selectively fixes a control point of a displayed graphical object to impede its movement, the graphical object may nevertheless lean or stretch in a direction of a user's movement to suggest the effect of the fixed control point. The overall impression to the user may be that the graphical object has more "substance" and that the user is interacting with an object that is somehow more "real" (e.g., such that "the interface feels more alive"). For example, inertia of an object may cause distortion of the object to be animated even after a user has finished actively moving a control point.

Manipulated modeled graphical object content 237 may cause the displayed manipulation of a graphical object to be animated in various ways. As just one example, with reference to displayed box-shaped drawing shape graphical object 320, manipulated modeled graphical object content 237 may physically simulate and render the stretching of object 320 when a user fixes one or more control points 326 to canvas 301 but activates another control point 326 for movement in accordance with a particular user motion. For example, as shown by screen 300c of FIG. 3C, in response to user hit information 231 indicative of a user fixing each one of control points 326-1, 326-2, and 326-4 to canvas 301 in their original positions of FIG. 3B, activating control point 326-3, and neither activating nor fixing control point 326-5, and in response to user movement information 241 indicative of a user motioning in the direction of arrow M1 of FIG. 3B, graphical display system 201 may physically simulate the associated manipulation of graphical object 320 and re-render graphical object 320 to the configuration shown in FIG. 3C. As compared to its original position of FIG. 3B, which is shown in broken-lines in FIG. 3C, manipulated graphical object 320 of FIG. 3C may have been stretched or pulled to its new configuration. For example, at least some of the constraints between at least some of the polygonal mesh vertices of graphical object 320 may be flexible or otherwise not rigid such that this manipulation may be achieved.

It is to be understood that any suitable number of other screens may have been rendered and displayed by graphical display system 201 between screen 300b of FIG. 3B and screen 300c of FIG. 3C in order to present the animation of the inertial distortion of graphical object 320 as it is being manipulated in accordance with the user's hit information 231 and the user's movement information 241 (e.g., to provide the user with real-time feedback and rendering of the graphical object manipulation). As shown in FIG. 3C, for example, control point 326-5, which may have been neither fixed to canvas 301 nor actively selected for movement by the user, may nevertheless have been moved along canvas 301. This movement may vary in accordance with whatever physical attributes and integration schemes are employed by polygonal modeling module 214 and/or physical simulation integrating module 236 with respect to polygonal mesh 215. Similarly, other vertices of the polygonal mesh 215 for graphical object 320 that are not represented by rendered control points (e.g., each of the vertices represented by control points 326 in FIG. 3A but not in FIG. 3B or FIG. 3C), may also be moved in a similar manner to the vertex represented by control point 326-5. That is, each vertex not represented by a control point may be treated by graphical display system 201 as neither fixed to canvas 301 nor actively selected for movement by the user.

Any suitable user input component 110 may allow a user to generate user movement information 241. For example, a multi-touch pad or multi-touch screen input component may allow a user to place two fingers or two cursors at the position of control point 326-3 of FIG. 3B and then move a first finger or a first cursor along canvas 301 in accordance with a user movement in the direction of arrow M1 to the new position of control point 326-3 of FIG. 3C while simultaneously maintaining the second finger or cursor at the initial position of control point 326-3 of FIG. 3B (e.g., a 2-finger stretching motion for generating user movement information 241). The opposite process may be considered a 2-finger pinching motion for returning control point 326-3 from its position in FIG. 3C to its position in FIG. 3B.

Figure 3D:
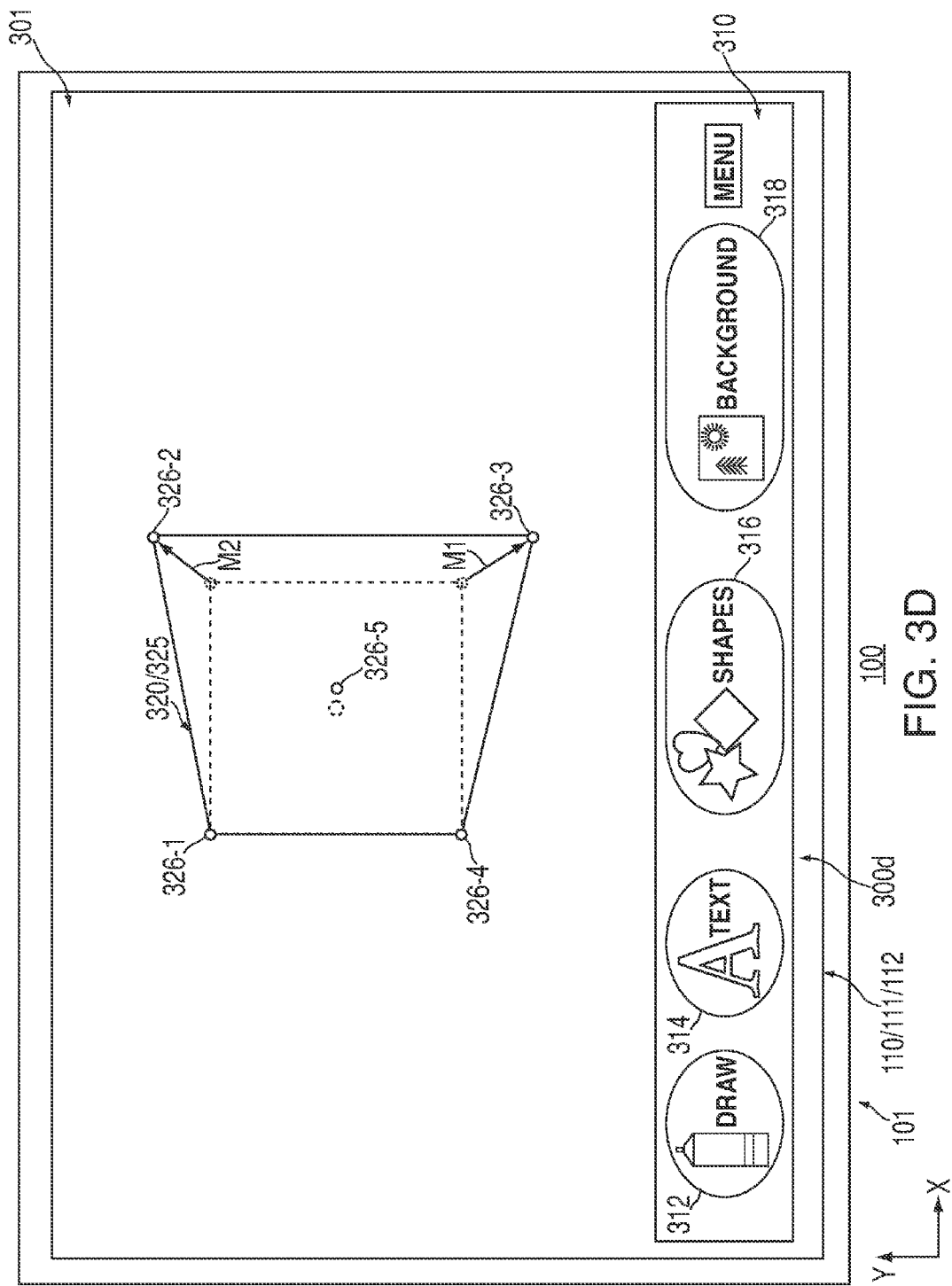

As yet another example, with reference to displayed box-shaped drawing shape graphical object 320, manipulated modeled graphical object content 237 may physically simulate and render the stretching of object 320 when a user fixes one or more control points 326 to canvas 301 but activates two or more other control points 326 for movement in accordance with a particular user motion. For example, as shown by screen 300d of FIG. 3D, in response to user hit information 231 indicative of a user fixing each one of control points 326-1 and 326-4 to canvas 301 in their original positions of FIG. 3B, activating control points 326-2 and 326-3, and neither activating nor fixing control point 326-5, and in response to user movement information 241 indicative of a user motioning in the directions of arrows M1 and M2 of FIG. 3B, graphical display system may physically simulate the associated manipulation of graphical object 320 and re-render graphical object 320 to the configuration shown in FIG. 3D (e.g., the simultaneous manipulation of control point 326-2 in the direction of arrow M2 and control point 326-3 in the direction of arrow M1). As compared to its original position of FIG. 3B, which is shown in broken-lines in FIG. 3D, manipulated graphical object 320 of FIG. 3D may have been stretched or pulled to its new configuration. Similarly to the example of FIG. 3C, control point 326-5, which may have been neither fixed to canvas 301 nor actively selected for movement by the user, may nevertheless have been moved along canvas 301 to a new position as shown in FIG. 3D.

It is to be understood that user movement information 241 may be indicative of more than one user movement at a particular time. For example, as shown in FIGS. 3B and 3D, user movement information 241 may be indicative of a first user movement in the direction of arrow M1 as well as indicative of a second user movement in the direction of arrow M2. Graphical display system 201 may be configured to selectively associate each user movement of user movement information 241 with one or more respective control points of a displayed graphical object for manipulation. For example, graphical display system 201 may detect the initial position associated with each user movement and may then associate each activated control point with the user movement whose initial position is closest to that activated control point. Therefore, in some embodiments, the mapping of one or more selectively activated control points (e.g., as indicated by hit information 231) to one or more manipulation points or user motion events (e.g., as indicated by movement information 241) may be accomplished based on one or more determined distances. For example, system 201 may be configured such that a position (e.g., an initial position, end position, and/or intermediate position) of a user's motion event or user movement must be within a certain distance of a selectively activated control point in order for it to have an effect on that control point. Therefore, if such a distance threshold is 10 pixels, for example, and if a first position of a first user movement is determined to be 6 pixels from a first selectively activated control point, while a second position of a second user movement is determined to be 5 pixels from a second selectively activated control point but 24 pixels from the first selectively activated control point, then the first user movement may be used to move the first selectively activated control point and the second user movement may be used to move the second selectively activated control point. Therefore, two control points may be moved differently at the same time. For example, when a user interacts with device 100 using a multi-touch input component 110, the independent but simultaneous movement of two distinct finger or cursor gestures may be used to move respective control points. However, a single control point may not be moved in two directions at once. For example, only one of multiple user movements may be associated with a single control point (e.g., based on the respective distances of the movements from the control point), or a difference between the movements may be used to move the control point.

Any suitable user input component 110 may allow a user to generate user movement information 241 with multiple user movements at the same time. For example, a multi-touch pad or multi-touch screen input component may allow a user to move a first finger or a first cursor along canvas 301 in accordance with a first user movement in the direction of arrow M1 simultaneously with a second finger or a second cursor along canvas 301 in accordance with a second user movement in the direction of arrow M2 (e.g., a 2-finger stretching motion for generating user movement information 241). In some embodiments, such a multi-touch input component may allow for a user to move a first finger or a first cursor along canvas 301 in accordance with a first user movement in the direction of arrow M1 simultaneously with a second finger or a second cursor along canvas 301 in accordance with a second user movement in the direction of arrow M2 (e.g., a 2-finger stretching motion for generating user movement information 241), while also holding a third finger or a third cursor on canvas 301 at a fixed location for fixed control point 326-1 and a fourth finger or a fourth cursor on canvas 301 at a fixed location for fixed control point 326-4 (e.g., for generating user hit information 231 and user movement information 241 substantially simultaneously).

Another illustrative example of how graphical display system 201 may generate, manipulate, and display graphical object content may be explained with reference to FIGS. 3E-3H.

FIGS. 3E-3H, for example, show electronic device 100 with housing 101 and display 112 presenting respective exemplary screens 300e-300h of visual information. As with screens 300a-300d, at least a portion of the visual information of each one of screens 300e-300h may be generated by graphical object generating module 210 and processed by graphical object processing module 220 of graphical display system 201. However, unlike screens 300a-300d of FIGS. 3A-3D, which are described with respect to a drawing shape graphical object 320, screens 300e-300h may illustrate an interface for a virtual drawing space application of device 100 that may present a text string graphical object 420 to a user.

Figure 3E:
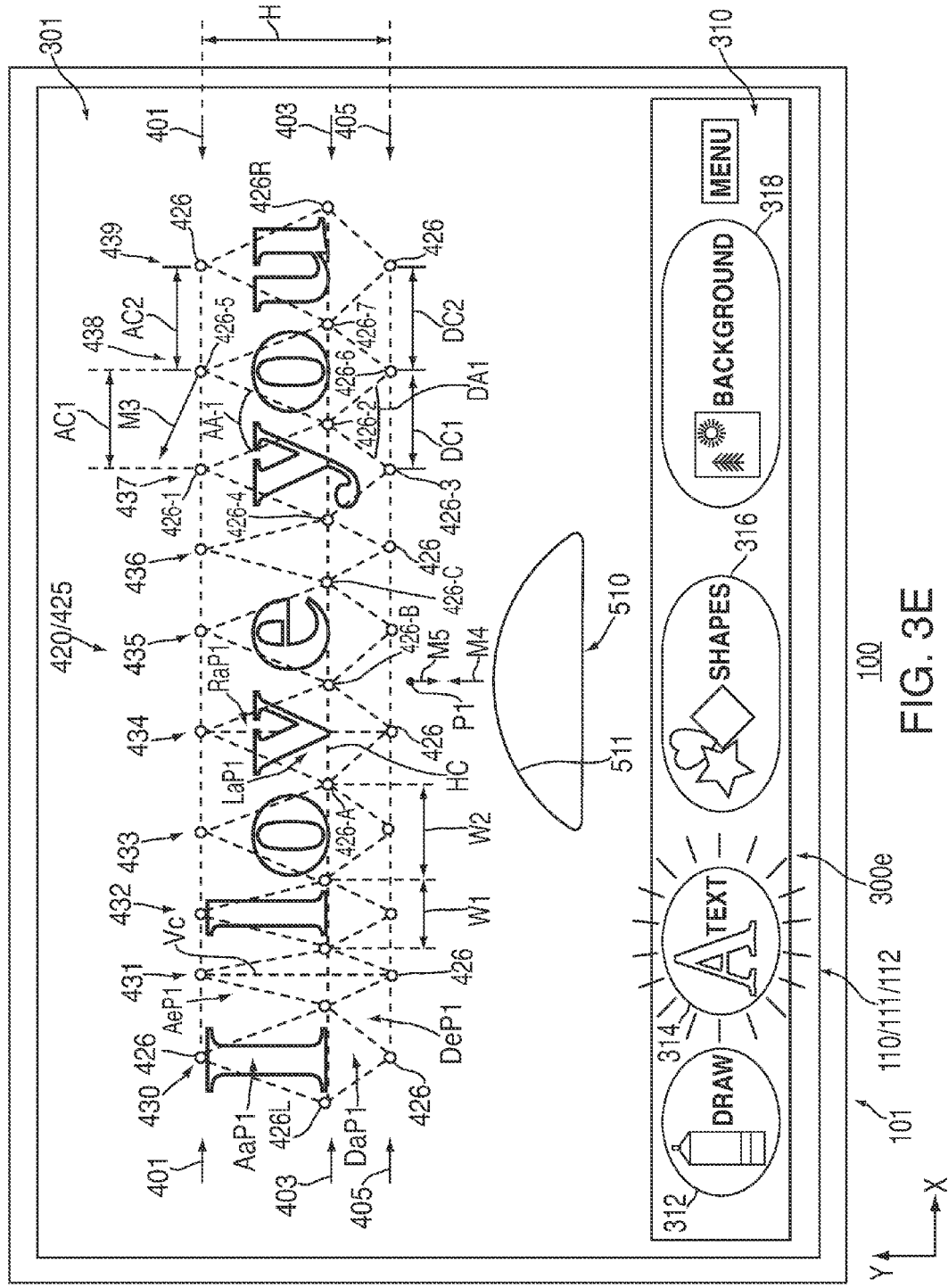

As shown by screen 300e of FIG. 3E, for example, a user may select text string input option 314 of artist menu 310 for entering one or more characters having one or more characteristic properties in canvas area 301. When a user selects text string input option 314, a sub-menu of the application (not shown) may be displayed that can provide the user with one or more different character properties to be selected by the user for the text string characters to be created (e.g., similar to drawing shape sub-menu 316a of FIG. 3A, but with text string character property options, such as font type, color, etc.). Any selections made by the user with respect to the options provided by text string input option 314 may be received by graphical display system 201 for generating and displaying text string graphical object content in canvas area 301. For example, selections made by the user with respect to the options provided by text string input option 314 may be received by content defining module 212 of graphical object generating module 210 as text string input information 211.

When a user selects text string input option 314 for creating a text string, the application may allow the user to type or otherwise enter one or more selected characters as text string information 211 (e.g., via a keyboard input component 110 of device 100). The one or more selected characters may be received by content defining module 212 as text string input information 211, and content defining module 212 may generate the one or more appropriate glyphs as graphical object content 213. This content 213 may be processed by rendering module 222 to generate at least a portion of rendered graphical object data 223 with pixel data that may represent that glyph content 213, and that glyph pixel data may be presented on display 112 at a particular position in canvas area 301. For example, as also shown by screen 300e of FIG. 3E, in response to a user selecting one or more characters for creating a text string, graphical display system 201 may generate and present text string graphical object 420 in canvas area 301 of display 112 (e.g., an illustrative text string graphical object representative of a user's selection of the characters defining the phrase "I love you").

As shown in FIG. 3E, text string graphical object 420 may be representative of ten characters (i.e., an "I" character 430, a "[space]" character 431, an "l" character 432, an "o" character 433, a "v" character 434, an "e" character 435, another "[space]" character 436, a "y" character 437, another "o" character 438, and a "u" character 439). Each character represented by text string graphical object 420 on canvas 301 may be a rendered glyph. In some embodiments, graphical display system 201 may initially generate and render a text string graphical object in a linear configuration. For example, as shown in FIG. 3E, each character may be positioned along a linear baseline 403 (e.g., an imaginary linear baseline extending between linear arrows 403 of FIG. 3E). Characters of a particular set of properties may also be generated with respect to a linear ascent line 401 (e.g., an imaginary linear ascent line extending between linear arrows 401 of FIG. 3E) and a linear descent line 405 (e.g., an imaginary linear descent line extending between linear arrows 405 of FIG. 3E). These three typographical boundary lines may help define a consistent appearance for a string of text.

While each one of characters 430-439 may be "resting" on baseline 403, some of the characters may extend upwardly towards ascent line 401 (e.g., the "I" character 430), and some of the characters may extend downwardly towards descent line 405 (e.g., the "y" character 437). In other embodiments, some characters may not be resting on a baseline but may still be contained between an ascent line and a descent line (e.g., a degree symbol character "°" may not rest on a baseline). However, in some embodiments, graphical display system 201 may limit the rendering of each character glyph of a particular text string graphical object to be contained between a particular ascent line 401 and a particular descent line 405. These upper and lower boundaries may be unique to characters of one or more particular properties, such as characters of a particular size and/or a particular font, and characters of different properties may be generated and rendered according to different ascent, descent, and baselines as separate text string graphical objects.

The initial position of text string graphical object 420 in canvas area 301 may be determined in any suitable way. For example, the user may select a portion of the canvas where text string graphical object 420 should be initially positioned. Alternatively, the virtual drawing space application may automatically determine the initial position of new graphical object 420, which may be done based on other content already existing in canvas area 301 or based on a pre-defined initial position for the selection made by the user.

Moreover, in addition to generating and rendering glyph content 213 for displaying "I love you" text string graphical object 420, graphical display system 201 may also generate a polygonal mesh 215 based on that content 213. In some embodiments, at least a portion of that polygonal mesh 215 may be processed by rendering module 222 to generate a portion of rendered graphical object data 223 with pixel data that may represent that polygonal mesh 215. That polygonal mesh pixel data may be presented on display 112 as a map of one or more control points at one or more appropriate positions in canvas area 301 with respect to its associated graphical object 420. For example, as also shown by screen 300e of FIG. 3E, in response to a user selecting the characters "I love you" for creating a text string graphical object, graphical display system 201 may generate and present a point map 425 in canvas area 301 of display 112 along with text string graphical object 420. Control point map 425 may include a collection of control points, each of which may be representative of a respective vertex of its associated polygonal mesh 215. In some embodiments, each vertex of the polygonal mesh 215 may be represented by a respective control point of control point map 425. Alternatively, only certain vertices of a polygonal mesh 215 may be represented by respective control points of map 425.

In some embodiments, graphical display system 201 may render each character glyph on canvas 301 as the user selects that character, such that displayed graphical object 420 may be continually updated in real-time as the user types in the characters defining that text string graphical object. Therefore, content defining module 212 may continually update graphical object content 213, and rendering module 222 may continually update rendered graphical object data 223, as a user selects a new character to be included in text string graphical object 420. Moreover, in some embodiments, polygonal modeling module 214 may also continually update a polygonal mesh 215 in response to continually updated graphical object content 213, such that at least a portion of polygonal mesh 215 may be continually rendered by rendering module 222 on canvas 301 (e.g., as a continually updated control point map 425) as a user selects a new character to be included in displayed text string graphical object 420. Alternatively, polygonal modeling module 214 may only generate a polygonal mesh 215 in response to an indication from the user or a device application that graphical object content 213 is complete and that no other characters are to be selected for the text string. Therefore, in some embodiments, although glyph graphical object content 213 may be continually updated and rendered on canvas 301 as a user selects new characters to be included in text string graphical object 420, an associated polygonal mesh 215 may be generated less often and may only be rendered on canvas 301 as a control point map 425 once all the characters of the text string have been selected.

As mentioned, the number of polygons and the manner in which they may be arranged and coupled to one another in a polygonal mesh 215 provided by polygonal modeling module 214 may vary based on the geometry and type of the graphical object content 213 received from content defining module 212. For example, with respect to the polygonal mesh 215 represented by control point map 425 for the graphical object content 213 represented by text string graphical object 420, as shown in FIG. 3E, thirty-eight polygons may be generated by polygonal modeling module 214, and these thirty-eight polygons may include thirty-one vertices, such that control point map 425 may include thirty-one respective control points 426. As mentioned, it is to be understood that only certain vertices of mesh 215 for a particular text string graphical object may actually be presented to a user as visible control points on a displayed text string graphical object control point map. For example, as opposed to displaying all thirty-one vertices of mesh 215 with thirty-one respective control points 426, as shown in FIG. 3E, graphical display system 201 may only display control points for a select subset of the polygonal mesh vertices. It is also to be understood that, although some of the sides or edges of some of the polygons of mesh 215 of text string graphical object 420 may be shown by hatched lines in FIG. 3E, in some embodiments only the vertices of mesh 215 may actually be presented by rendered graphical object data 223 on display 112, for example, as control points 426 of map 425 (see, e.g., FIGS. 3F and 3G).

In some embodiments, in order to maintain a level of consistency with respect to the way in which a user may manipulate different portions of a text string graphical object, polygonal modeling module 214 may generate a mesh 215 according to one or more certain specifications that are independent of the actual shapes of the character glyphs of the text string. One or more polygonal modeling techniques may be consistently applied to each character of a text string graphical object such that at least one of the ways in which a user may manipulate the graphical object may provide a consistent result across all the characters of the manipulated object. For example, a polygonal mesh for a text string graphical object may include a set of one or more "intra-character" polygons for each character glyph and the number of intra-character polygons per character may be the same for each character in the text string. With respect to the polygonal mesh 215 represented by control point map 425 for the graphical object content 213 represented by text string graphical object 420, as shown in FIG. 3E, for example, twenty intra-character polygons may be generated by polygonal modeling module 214, (e.g., two polygons per character of the text string). These twenty intra-character polygons may include thirty-one vertices, such that control point map 425 may include thirty-one respective control points 426. It is to be understood, however, that the granularity of polygons may be more or less than two per character (e.g., more or less than two intra-character polygons), and the number of vertices may be more or less than thirty-one. In some embodiments, the number of intra-character polygons may be different for different characters.

Moreover, in order to maintain a level of consistency with respect to the way in which a user may manipulate different portions of a text string graphical object, the set of intra-character polygons for each character of a text string graphical object may be similarly generated with respect to the typographical bounds of the text string. For example, as shown in FIG. 3E, two intra-character polygons for each character glyph may share two vertices that may be coupled by an edge or constraint running along baseline 403. Moreover, a first of those two intra-character polygons including two "baseline vertices" may also include a third vertex that is positioned along the ascent line 401 (e.g., an "ascent vertex") to form an "ascent intra-character polygon", while a second of those two intra-character polygons including two baseline vertices may also include a third vertex that is positioned along the descent line 405 (e.g., a "descent vertex") to form a "descent intra-character polygon". For example, as shown, the "I" character glyph 430 may be modeled to include an ascent intra-character polygon AaP1 and a descent intra-character polygon DaP1. In some embodiments, rather than ascent intra-character polygon AaP1 and descent intra-character polygon DaP1 being distinct triangular polygons, ascent intra-character polygon AaP1 and descent intra-character polygon DaP1 could instead be formed by mesh 215 as a single four-sided intra-character polygon (e.g., a quad intra-character polygon). In some embodiments, as shown in FIG. 3E, for example, the third vertex of each ascent intra-character polygon and each descent intra-character polygon may be equally spaced from the other two vertices of that polygon. For example, in such embodiments, if a line segment were to extend from the ascent vertex of an ascent intra-character polygon to the descent vertex of a descent intra-character polygon of a particular character, that line segment might intersect the baseline 403 at a point half-way between the two shared baseline vertices of those two polygons (e.g., each intra-character polygon may be an isosceles triangle). In some embodiments, such a line segment may actually be defined as an additional constraint of the character glyph (e.g., a constraint that may extend between the ascent vertex of its ascent intra-character polygon and the descent vertex of its descent intra-character polygon, such as constraint VC of the "[space]" character glyph 431). In some other embodiments, rather than a character glyph being modeled as a distinct ascent intra-character polygon and a distinct descent intra-character polygon (e.g., as AaP1 and DaP1 of the "I" character glyph 430), one or more or all character glyphs of a text string may be modeled as having two intra-character polygons that may share an ascent vertex and a descent vertex rather than two baseline vertices. For example, as shown, "v" character glyph 434 may be modeled to include a left intra-character polygon LaP1 and a right intra-character polygon RaP1, which may share an ascent vertex and a descent vertex.

In such an embodiment, an additional constraint of the character glyph may be provided, such as a baseline constraint extending between the baseline vertex of each intra-character polygon of the glyph character (e.g., a constraint HC of the "v" character glyph 434).

With continued reference to graphical object 420 of FIG. 3E, and embodiments in which each character glyph may be modeled into an ascent intra-character polygon and a descent intra-character polygon, the height of each character (e.g., the distance between the ascent vertex of a character's ascent intra-character polygon and the descent vertex of the character's descent intra-character polygon) may be the distance between ascent line 401 and descent line 405. Therefore, in some embodiments, each character of text string graphical component 420 may be of the same height H (e.g., as defined by the ascent vertex and the descent vertex of the intra-character polygons of each character). However, the width of each character (e.g., the initial length of the baseline constraint coupling the two shared baseline vertices of a character's intra-character polygons) may vary based on the character glyph being modeled. For example, as shown in FIG. 3E, the width W1 of the baseline constraint of the "l" character 432 extending between the two baseline vertices of that character's intra-character polygons may be different than the width W2 of the baseline constraint of the "o" character 433 extending between the two baseline vertices of that character's intra-character polygons. This spacing between baseline vertices of a character's intra-character polygons may depend on the glyph shape of that particular character. In some embodiments, this spacing between baseline vertices of a character's intra-character polygons may depend not only on the glyph shape of that particular character but also on the type of character immediately preceding and/or immediately following that particular character in the displayed text string graphical object.

Alternatively, a polygonal mesh 215 for text string graphical object content 213 may be uniquely modeled to the shape of each individual character of the text string and may not necessarily be tied to the typographical bounds of the text string. For example, in some embodiments, a polygonal mesh portion for a particular character of a text string may be at least partially modeled based on the extent to which the character approaches an ascent line and/or a descent line of the text string (e.g., as opposed to the illustrative polygonal mesh of text string graphical object 420 of FIG. 3E, which may be modeled to include polygonal mesh vertices along the ascent and descent lines of the text string for each character regardless of the extent to which the character approaches those lines).

Moreover, in order to maintain a level of consistency with respect to the way in which a user may manipulate different portions of a text string graphical object, at least one intra-character polygon of a first character may share at least one vertex with at least one intra-character polygon of a second character that is consecutive with the first character in a text string graphical object. In some embodiments, a vertex shared by two consecutive characters may be positioned on a certain typographical bound of the text string. For example, as shown in FIG. 3E, a baseline vertex of at least one intra-character polygon of a first character may also be a baseline vertex of at least one intra-character polygon of a second character that is consecutive with the first character in text string graphical object 420. As shown, a vertex positioned on baseline 403, which may be a shared baseline vertex between an ascent intra-character polygon and a descent intra-character polygon for a first character, may also be a shared baseline vertex of two intra-character polygons for a second character that is consecutive with the first character.

As still yet another way to maintain a level of consistency with respect to the way in which a user may manipulate different portions of a text string graphical object, a polygonal mesh for a text string graphical object may include a set of one or more "inter-character" polygons between any two consecutive characters in the text string, and the number of inter-character polygons between two consecutive characters may be the same for every pair of consecutive characters in the text string. For example, with respect to the polygonal mesh 215 represented by control point map 425 for the graphical object content 213 represented by text string graphical object 420, as shown in FIG. 3E, eighteen inter-character polygons may be generated by polygonal modeling module 214, (e.g., two polygons per pair of consecutive characters in the text string). It is to be understood, however, that the granularity of inter-character polygons may be more or less than two per pair of consecutive characters in the text string. In some embodiments, the number of inter-character polygons may be different for different pairs of consecutive characters in the text string.

At least one inter-character polygon between first and second consecutive characters may share at least one vertex with at least one intra-character polygon of the first character and may share at least one vertex with at least one intra-character polygon of the second character. In some embodiments, at least one inter-character polygon between first and second consecutive characters may share at least one vertex with both an intra-character polygon of the first character and an intra-character polygon of the second character. Moreover, in some embodiments, a first inter-character polygon between first and second consecutive characters may share at least one vertex not only with an intra-character polygon of the first character and an intra-character polygon of the second character, but also with a second inter-character polygon between the first and second consecutive characters.

For example, as shown in FIG. 3E, a baseline vertex, which may be a shared vertex of at least one intra-character polygon for a first character and at least one intra-character polygon for a second character that is consecutive with the first character, may also be a shared vertex for each of the two inter-character polygons between the first and second characters. As shown in FIG. 3E, for example, a first of the two inter-character polygons sharing a baseline vertex may also include two ascent vertices positioned along the ascent line 401 to form an "ascent inter-character polygon", while a second of those two inter-character polygons may also include two descent vertices positioned along the descent line 405 to form a "descent inter-character polygon". For example, as shown, an ascent inter-character polygon AeP1 and a descent inter-character polygon DeP1 may be modeled between the "I" character glyph 430 and the first "[space]" character glyph 431. In some embodiments, a first of the two ascent vertices of the ascent inter-character polygon may also be the ascent vertex of the first character, and the second of the two ascent vertices of the ascent inter-character polygon may also be the ascent vertex of the second character consecutive to the first character in the text string. Similarly, in some embodiments, a first of the two descent vertices of the descent inter-character polygon may also be the descent vertex of the first character, and the second of the two descent vertices of the descent inter-character polygon may also be the descent vertex of the second character consecutive to the first character in the text string.

It is to be understood, however, that the modeling of a polygonal mesh of a text string graphical object may generate any suitable number of intra-character polygons and any suitable number of inter-character polygons, and that the manner in which any one of those polygons shares one or more vertices with any other one of those polygons may be varied according to different embodiments. The number and configuration of the polygons of mesh 215 for "I love you" text string graphical object 420 of FIG. 3E is only illustrative.

Once a particular graphical object type (e.g., an "I love you" text string) has been selected, and once graphical display system 201 has generated and rendered both a corresponding graphical object 420 and at least a subset of the polygonal mesh vertices associated with that graphical object as control points 426 on canvas area 301 of display 112, graphical display system 201 may provide the user with the ability to manipulate the displayed text string graphical object in various ways. For example, a user may interact with one or more of the displayed control points 426 to manipulate the presentation of the text string graphical object in various ways. As described with respect to drawing shape graphical object 320 of FIGS. 3A-3D, a user may select one or more control points 426 to be actively moved by the user for manipulating the shape and position of text string graphical object 420 in canvas 301. Additionally or alternatively, in some embodiments, a user may select one or more control points 426 to be fixed in place on canvas 301 before actively moving one or more other control points 426, such that the user may have more command over the ways in which the shape and position of graphical object 420 may be manipulated. As mentioned, the vertices of a polygonal mesh 215 may be physically simulated as distinct masses with various types of constraints therebetween. Therefore, by providing the user with the ability to move one or more vertices of graphical object 420 with respect to one or more other vertices of graphical object 420 (e.g., via interaction with respective control points 426), graphical display system 201 may provide for the animation of inertial distortion of displayed graphical object 420 and/or for the animation of the manipulation of some characters of a text string with respect to the manipulation of some other characters of the text string.

For example, when "I love you" text string graphical object 420 and a set of thirty-one control points 426 are displayed on canvas 301, as shown in FIG. 3E, a user may be able to interact with at least thirty-two distinct portions of displayed graphical object 420. The user may be able to interact with each of the thirty-one displayed control points 426, for example, either to selectively fix the control point to canvas 301 in order to prevent future movement of that control point on canvas 301 or to selectively activate the control point for active future movement of the control point on canvas 301. By neither selectively fixing nor selectively activating a particular control point, any future movement of that control point may be dictated by the movement and/or non-movement of other control points. Moreover, the user may be able to interact with a non-control point portion of displayed graphical object 420 to selectively activate the entire object for active future movement of the entire object on canvas 301. Each one of these user interactions may generate user hit information 231 and may be accomplished by the user providing one or more particular types of input with respect to one or more particular distinct portions of displayed graphical object 420 using one or more input components 110.

As mentioned, the attributes of each vertex of a polygonal mesh 215 and the attributes of each vertex's relationship to any other vertex coupled thereto (e.g., its mass, the flexibility or rigidity of each of its constraints, a minimum and/or a maximum distance to be ensured between two vertices, a minimum or maximum size of an angle to be ensured as formed by two constraints at a common vertex, and the like) may be determined by polygonal modeling module 214 and/or by physical simulation integrating module 236. The determination of these attributes may be based on any suitable information, such as the type of graphical object that mesh 215 was modeled on, the application being run by device 100, user preferences, the one or more integration schemes that may be employed for the physical simulation, and the like. Moreover, these determined attributes of a graphical object's polygonal mesh may affect the ways in which the graphical object is physically simulated during manipulation of the object.

Moreover, there are several ways to maintain a level of consistency with respect to the way in which a user may manipulate different portions of a text string graphical object. For example, each character glyph of a text string may be polygonally modeled similarly to one another in one or more ways. In some embodiments, a particular constraint of a particular intra- and/or inter-character polygon of each character may be defined with one or more of the same attributes so that the manipulation of the text string may produce consistent results amongst all the characters of the text string.

For example, in some embodiments, one or more particular constraints of one or more intra-character polygons may be rigid for every character in a text string graphical object. Despite the fact that the initial width of each character of text string graphical object 420 (i.e., the length of the baseline constraint extending between the two baseline vertices of a character's intra-character polygons of FIG. 3E) may be different from one another, in some embodiments that baseline constraint of each character may be configured to be rigid such that the distance between each character's two baseline vertices may always be maintained as the initial width of that character. Therefore, no matter the ways in which a user may attempt to manipulate a text string graphical object, the length of the baseline constraint of each character may be rigidly maintained at the character's initial width of FIG. 3E. In some embodiments, an additional constraint may be provided for a character glyph in addition to a baseline constraint. For example, as shown with respect to character 431, a constraint VC extending between an ascent vertex and a descent vertex of a character may add an additional constraint. For example, such a constraint may enable the baseline constraint of that character to be a "signed" or "non-invertible" constraint. The VC constraint may be perpendicular to or may otherwise cross the baseline constraint, and thereby may be used to compute a signed distance between the baseline vertices of the glyph character. Such a signed distance may prevent a first of the baseline vertices from being manipulated to cross-over to the other side of the second of the baseline vertices, even if such a cross-over may still provide for the rigid distance between the two vertices. For example, if the distance between the two baseline vertices is detected as having a negative value (e.g., the vertices are on opposite sides of constraint VC), then they may be pulled or otherwise forced or simulated back to their proper respective sides of constraint VC. Therefore, a signed constraint may provide an additional layer of control with respect to the manipulation of portions of a modeled graphical object. Moreover, in some embodiments, every other constraint of each character's intra-character polygons may be rigidly maintained at their initial lengths of FIG. 3E. Such a configuration may ensure that each displayed character glyph can maintain its initial appearance and cannot be stretched or otherwise manipulated.

However, although each intra-character polygonal constraint of each character in text string graphical object 420 may be configured as rigid so as to maintain the displayed appearance and shape of each character glyph, one or more other constraints of the polygonal mesh of graphical object 420 may be configured differently such that graphical object 420 may still be manipulated in some ways from its initial appearance of FIG. 3E. For example, an ascent constraint coupling the two ascent vertices of an ascent inter-character polygon may be configured to be non-rigid. Additionally or alternatively, a descent constraint coupling the two descent vertices of a descent inter-character polygon may be configured to be non-rigid.

For example, as shown in FIG. 3E, length AC1 of the ascent constraint coupling the two ascent vertices of the ascent inter-character polygon between consecutive characters 437 and 438 may be configured to be non-rigid. Moreover, length DC1 of the descent constraint coupling the two descent vertices of the descent inter-character polygon between those same consecutive characters 437 and 438 may also be configured to be non-rigid. For example, each of those two constraints may be configured to allow its length (e.g., AC1 or DC1) to be varied such that the positions of characters 437 and 438 may be manipulated with respect to one another (e.g., about the baseline vertex common to the intra-character polygons of those two characters). However, in order to ensure that the "y" glyph of character 437 does not interfere with or substantially overlap the "o" glyph of character 438 during such manipulation, one or both of lengths AC1 and DC1 may be configured to never exceed a certain maximum length and/or to never be less than a certain minimum length (e.g., their respective constraints may be configured as inequality constraints). Therefore, no matter the ways in which a user may attempt to manipulate text string graphical object 420, the "y" glyph of character 437 may not interfere with or substantially overlap the "o" glyph of character 438 on canvas 301, at least beyond a certain amount (e.g., as determined by the configuration of the inter-character polygon ascent constraint with respect to an enforceable minimum and/or maximum for length AC1 and/or as determined by the configuration of the inter-character polygon descent constraint with respect to an enforceable minimum and/or maximum for length DC1).

As another example, as shown in FIG. 3E, length AC2 of the ascent constraint coupling the two ascent vertices of the ascent inter-character polygon between consecutive characters 438 and 439 may be configured to be non-rigid. Moreover, length DC2 of the descent constraint coupling the two descent vertices of the descent inter-character polygon between those same consecutive characters 438 and 439 may also be configured to be non-rigid. For example, each of those two constraints may be configured to allow its length (e.g., AC2 or DC2) to be varied such that the positions of characters 438 and 439 may be manipulated with respect to one another (e.g., about the baseline vertex common to the intra-character polygons of those two characters). However, in order to ensure that the "o" glyph of character 438 does not interfere with or substantially overlap the "u" glyph of character 439 during such manipulation, one or both of lengths AC2 and DC2 may be configured to never exceed a certain maximum length and/or to never be less than a certain minimum length (e.g., their respective constraints may be configured as inequality constraints). Therefore, no matter the ways in which a user may attempt to manipulate text string graphical object 420, the "o" glyph of character 438 may not interfere with or substantially overlap the "u" glyph of character 439 on canvas 301, at least beyond a certain amount (e.g., as determined by the configuration of the inter-character polygon ascent constraint with respect to an enforceable minimum and/or maximum for length AC2 and/or as determined by the configuration of the inter-character polygon descent constraint with respect to an enforceable minimum and/or maximum for length DC2).

It is to be understood, however, that the initial ascent constraint length AC1 between the "y" character 437 and the "o" character 438 may not be the same as the initial ascent constraint length AC2 between the "o" character 438 and the "u" character 439. This may be due to the fact that the width of the "y" character 437 may be different than the width of the "u" character 439, for example. Therefore, the minimum and/or maximum lengths with which ascent constraint length AC1 may be configured might not be the same as the minimum and/or maximum lengths with which ascent constraint length AC2 may be configured. Regardless, in some embodiments, each of those ascent constraints may be similarly configured to ensure that its two associated characters do not interfere with one another, at least beyond a certain amount. Similarly, it is to be understood, that the initial descent constraint length DC1 between the "y" character 437 and the "o" character 438 may not be the same as the initial descent constraint length DC2 between the "o" character 438 and the "u" character 439. Therefore, the minimum and/or maximum lengths with which descent constraint length DC1 may be configured might not be the same as the minimum and/or maximum lengths with which descent constraint length DC2 may be configured. Regardless, in some embodiments, each of those descent constraints may be similarly configured to ensure that its two associated characters do not interfere with one another, at least beyond a certain amount.

As yet another example, an angle formed by two constraints at a shared vertex of the polygonal mesh of graphical object 420 may be configured differently such that graphical object 420 may still be manipulated in some ways from its initial appearance of FIG. 3E. For example, an angle formed by two constraints of two consecutive character glyphs at a vertex shared by those two consecutive character glyphs may be configured to be non-rigid.

For example, as shown in FIG. 3E, an ascent angle AA1 formed by a constraint of the ascent intra-character polygon of character 437 and a constraint of the ascent intra-character polygon of character 438 at a shared baseline vertex of those two consecutive characters 437 and 438 may be configured to be non-rigid (e.g., at control point 426-2). Additionally or alternatively, a descent angle DA1 formed by a constraint of the descent intra-character polygon of character 437 and a constraint of the descent intra-character polygon of character 438 at a shared baseline vertex of those two consecutive characters 437 and 438 may be configured to be non-rigid. For example, one or both of those two angles may be configured to allow its angle size (e.g., AA1 and/or DA1) to be varied such that the positions of characters 437 and 438 may be manipulated with respect to one another (e.g., about the baseline vertex common to those two characters). However, in order to ensure that the "y" glyph of character 437 does not interfere with or substantially overlap the "o" glyph of character 438 during such manipulation, one or both of angle constraints AA1 and DA1 may be configured to never exceed a certain maximum angle size and/or to never be less than a certain minimum angle size (e.g., their respective angles may be configured as inequality angle constraints). Therefore, no matter the ways in which a user may attempt to manipulate text string graphical object 420, the "y" glyph of character 437 may not interfere with or substantially overlap the "o" glyph of character 438 on canvas 301, at least beyond a certain amount (e.g., as determined by the configuration of the angle constraint formed between polygon edges of the consecutive character glyphs at a vertex shared by those two polygon edges, with respect to an enforceable minimum and/or maximum for angle AA1 and/or DA1). In such embodiments, graphical object 420 may be considered to not include an ascent inter-character polygon between consecutive characters 438 and 439 and/or a descent inter-character polygon between those same consecutive characters 438 and 439. Rather an angle constraint AA1 and/or DA1 may maintain one or more relationships between the two consecutive character glyphs.

Therefore, by polygonally modeling each character of a graphical object text string according to one or more specific techniques and/or with one or more specific attributes, a level of consistency may be achieved with respect to the way in which a user may manipulate different portions of a text string graphical object. Such physically-based modeling and simulation of a text string graphical object may not only provide for more ways in which a user may manipulate the graphical object, but may also provide for a more realistic and intuitive graphical object interface with which the user may interact.

Manipulated modeled graphical object content 237 may cause the displayed manipulation of a text string graphical object to be animated in various ways. As just one example, manipulated modeled graphical object content 237 may physically simulate and render the manipulated altering of the structure of text string object 420 when a user fixes one or more control points 426 to canvas 301 but activates one or more other control points 426 for movement in accordance with a particular user motion. Consider an embodiment in which the length of each constraint of each intra-character polygon of each character of graphical object 420 is rigid and maintained at its initial length shown in FIG. 3E, and in which each ascent constraint of each ascent inter-character polygon and/or each descent constraint of each descent inter-character polygon of graphical object 420 is not rigid but instead is somewhat flexible between a defined minimum length and a defined maximum length. Then, for example, in response to user hit information 231 indicative of a user fixing each one of the control points 426 representative of each one of the vertices of the intra-character polygons for the "y" character 437 to canvas 301 in their original positions of FIG. 3E (e.g., control points 426-1, 426-2, 426-3, and 426-4), activating the control point 426 representative of the ascent vertex of the ascent intra-character polygon for the "o" character 438 (e.g., control point 426-5), and neither activating nor fixing any of the other control points of map 425, and in response to a user movement information 241 indicative of a user motioning in the direction of arrow M3 of FIG. 3E, graphical display system 201 may physically simulate the associated manipulation of graphical object 420 and re-render graphical object 420 to the configuration shown by screen 300f of FIG. 3F.

Figure 3F:
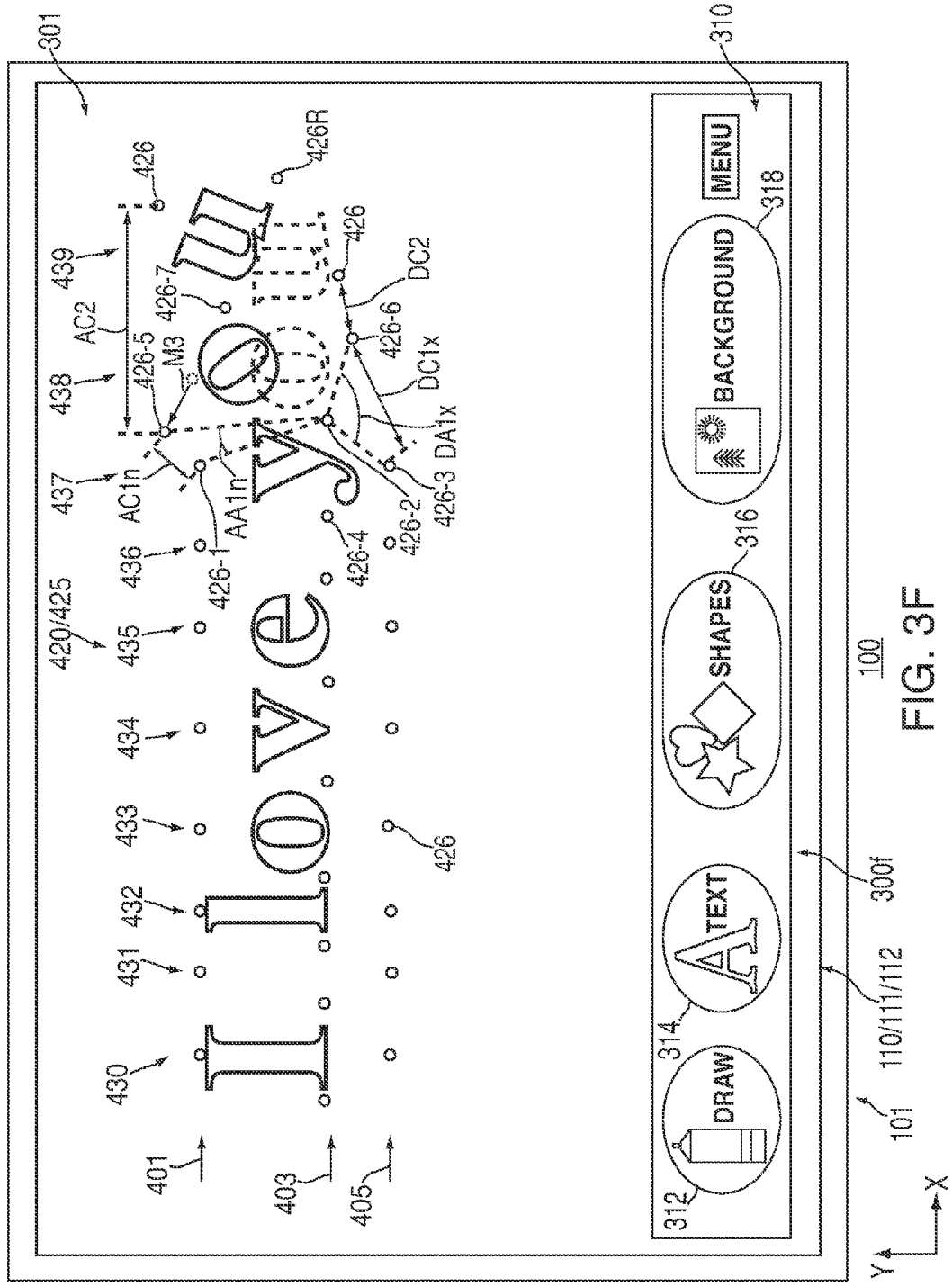

As compared to its original position of FIG. 3E, some of which is shown in broken-lines in FIG. 3F, manipulated graphical object 420 of FIG. 3F may have been pulled to its new configuration. The actively moved ascent vertex 426-5 of the "o" character 438 may have been moved in accordance with the user movement of arrow M3. However, the ascent constraint between ascent vertex 426-5 of the "o" character 438 and ascent vertex 426-1 of the "y" character 437 may have reached its minimum allowable length (e.g., minimum length AC1n), thereby preventing ascent vertex 426-5 of the "o" character 438 from being moved any further in accordance with the active user movement of arrow M3. Alternatively or additionally, the constraint between descent vertex 426-6 of the "o" character 438 and descent vertex 426-3 of the "y" character 437 may have reached its maximum allowable length (e.g., maximum length DC1x), thereby preventing ascent vertex 426-5 of the "o" character 438 from being moved any further in accordance with the active user movement of arrow M3. Such a maximum allowable length and/or such a minimum allowable length of associated inter-character polygonal constraints may prevent undesirable overlapping or interference between the "y" character 437 and the "o" character 438. For example, minimum length AC1n may be configured such that it may prevent the ascent intra-character polygon of the "o" character 438 from even partially overlapping with the ascent intra-character polygon of the "y" character 437 (e.g., as the ascent intra-character polygon of the "o" character 438 rotates about fixed control point 426-2 towards the ascent intra-character polygon of the "y" character 437 in accordance with the active user movement of arrow M3). That is, control point 426-5 may be prevented from becoming linear with both control point 426-2 and control point 426-1, or, put another way, the constraint coupling the vertices represented by control points 426-2 and 426-5 may be prevented from even partially overlapping the constraint coupling the vertices represented by control points 426-1 and 426-2.

As also shown in FIG. 3F, for example, the control points of characters 430-436, which may have been neither fixed to canvas 301 nor actively selected for movement by the user, may not have moved (e.g., due to the fact that each of them are only indirectly coupled to actively moved control point 426-5 via one or more of control points 426-1, 426-3, and 426-4, each of which have been fixed to canvas 301. However, as also shown in FIG. 3F, control points 426-6 and 426-7 of character 438 as well as one or more other control points of character 439, which too may have been neither fixed to canvas 301 nor actively selected for movement by the user, may nevertheless have been moved along canvas 301. This movement may vary in accordance with whatever physical attributes and integration schemes are employed by polygonal modeling module 214 and/or physical simulation integrating module 236 with respect to polygonal mesh 215. For example, in some embodiments, as shown, when ascent vertex 426-5 of the "o" character 438 may be moved in this way, the intra-character polygons of the "o" character 438 may pivot counter-clockwise about fixed baseline vertex 426-2, and the intra-character polygons of the "u" character 439 may pivot in an opposite direction (e.g., clockwise) about baseline vertex 426-7. The length of inter-character polygon ascent constraint AC1 between the "y" and "o" may get shorter (e.g., to AC1n), while the length of inter-character polygon descent constraint AC2 between "o" and "u" may get longer (e.g., such that respective corresponding inter-character descent constraint DC1 may get longer (e.g., to DC1x)). It is to be understood that any suitable number of other screens may have been rendered and displayed by graphical display system 201 between screen 300e of FIG. 3E and screen 300f of FIG. 3F in order to present the animation of the graphical object 420 as it is being manipulated in accordance with the user's hit information 231 and the user's movement information 241 (e.g., to provide the user with real-time feedback and rendering of the graphical object manipulation).

Alternatively, rather that restricting manipulation of a text string graphical object based on minimum and/or maximum distances of constraints extending between two vertices of an inter-character polygon, an angle constraint may be utilized to maintain certain characteristics of the text string. For example, as compared to its original position of FIG. 3E, some of which is shown in broken-lines in FIG. 3F, manipulated graphical object 420 of FIG. 3F may have been pulled to its new configuration. The actively moved ascent vertex 426-5 of the "o" character 438 may have been moved in accordance with the user movement of arrow M3. However, the ascent angle constraint AA1 formed between a constraint of the ascent intra-character polygon of the "o" character 438 and a constraint of the ascent intra-character polygon of the "y" character 437 at a common vertex 426-2 may have reached its minimum allowable angle size (e.g., minimum angle size AA1n), thereby preventing ascent vertex 426-5 of the "o" character 438 from being moved any further in accordance with the active user movement of arrow M3. Alternatively or additionally, the descent angle constraint DA1 formed between a constraint of the descent intra-character polygon of the "o" character 438 and a constraint of the descent intra-character polygon of the "y" character 437 at a common vertex 426-2 may have reached its maximum allowable angle size (e.g., maximum angle size DA1x), thereby preventing ascent vertex 426-5 of the "o" character 438 from being moved any further in accordance with the active user movement of arrow M3. Such a maximum allowable angle size and/or such a minimum allowable angle size at a shared vertex may prevent undesirable overlapping or interference between the "y" character 437 and the "o" character 438. For example, minimum angle size AA1n may be configured such that it may prevent the ascent intra-character polygon of the "o" character 438 from even partially overlapping with the ascent intra-character polygon of the "y" character 437 (e.g., as the ascent intra-character polygon of the "o" character 438 rotates about fixed control point 426-2 towards the ascent intra-character polygon of the "y" character 437 in accordance with the active user movement of arrow M3). That is, control point 426-5 may be prevented from becoming linear with both control point 426-2 and control point 426-1, or, put another way, the constraint coupling the vertices represented by control points 426-2 and 426-5 may be prevented from even partially overlapping the constraint coupling the vertices represented by control points 426-1 and 426-2. In some embodiments, angle constraint AA1 and/or angle constraint DA1 may be a signed angle constraint that may prevent the positional relationship between the edge constraints of the angle from being inverted or flipped with respect to one another and the angle itself.

As another example, with reference to displayed text string graphical object 420, manipulated modeled graphical object content 237 may physically simulate and render the manipulated altering of the structure of text string object 420 when a user activates multiple control points 426 for movement in accordance with a particular user motion generated by user movement of a virtual movement tool (e.g., a cursor or user touch) of any particular shape. For example, such a virtual movement tool may be provided on display 112 and controlled by an input component 110, and the shape of the virtual movement tool may be configured to activate multiple control points and/or to generate multiple user movements.

Consider an embodiment in which the length of each constraint of each intra-character polygon of each character of graphical object 420 is rigid and maintained at its initial length shown in FIG. 3E, and in which each ascent constraint of each ascent inter-character polygon and/or each descent constraint of each descent inter-character polygon of graphical object 420 is not rigid but instead is somewhat flexible between a defined minimum length and defined maximum length. Then, for example, as shown by screen 300e of FIG. 3E, in response to a virtual user input tool 510 having a curved (e.g., semi-circular shaped) leading surface 511 moving in at least the general direction of arrow M4 to at least some of the control points of map 425 of graphical object 420, user hit information 231 may be generated that is indicative of a user activating each one of the control points 426 contacted by virtual user input tool 510 during its movement, and user movement information 241 may be generated that is indicative of those activated control points being moved in accordance with the user movement of tool 510 in the direction of arrow M4. In response to receiving this user hit information 231 and this user movement information 241, graphical display system 201 may physically simulate the associated manipulation of graphical object 420 and re-render graphical object 420 to the configuration shown by screen 300g of FIG. 3G.

Figure 3G:
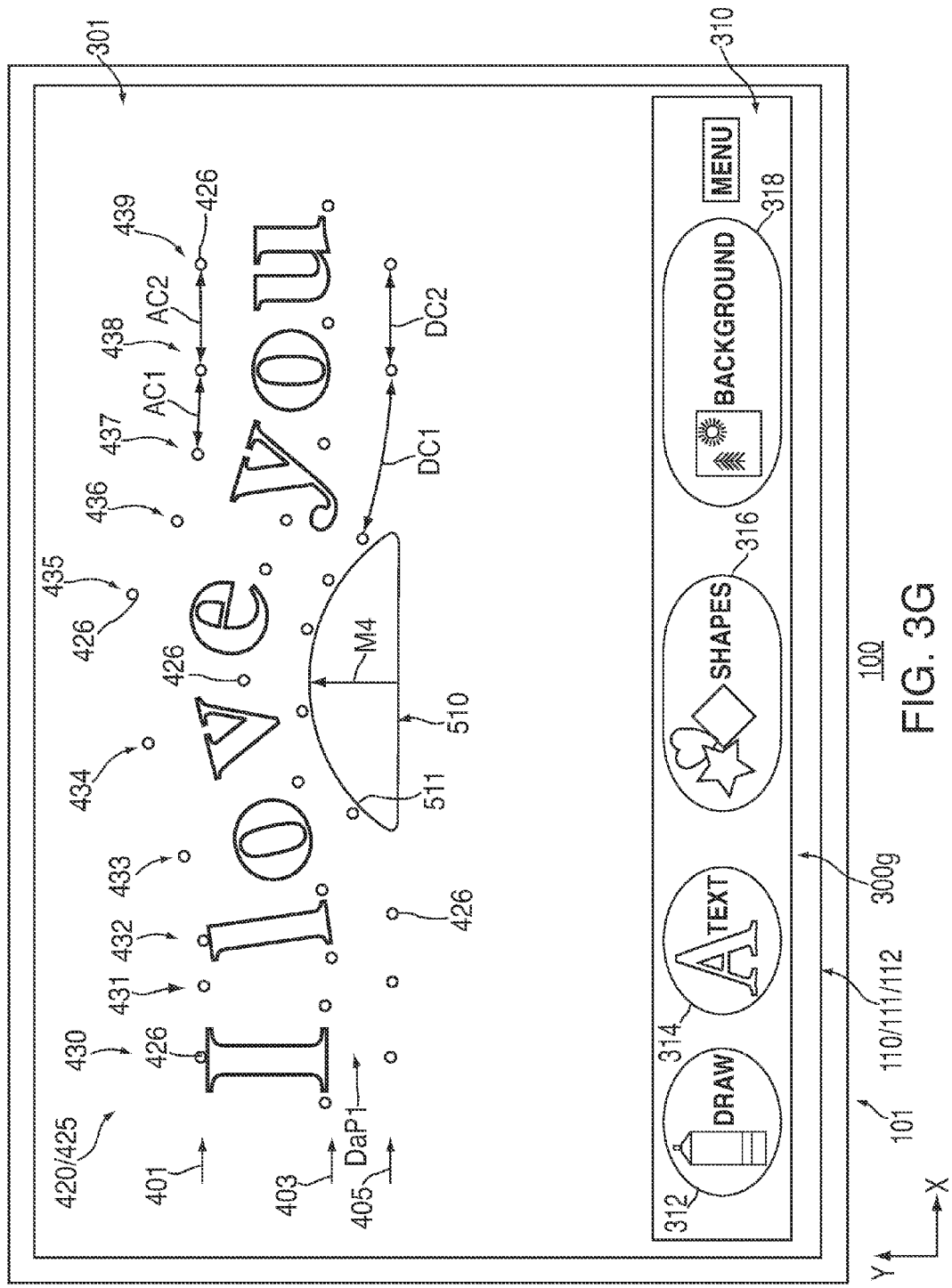

As compared to its original position of FIG. 3E, manipulated graphical object 420 of FIG. 3G may have been pushed to its new configuration. As shown in FIG. 3G, input tool 510 may have selectively activated the control points representative of the descent vertices of characters 433-436 such that those control points may have been actively moved in accordance with the user movement of the leading curved surface 511 of tool 510 in the direction of arrow M4. Due to the curvature of surface 511, however, the activated control points representative of the descent vertices of characters 433-436 may have each been moved in different directions from one another. All of the other control points 426 of map 425, which may have been neither fixed to canvas 301 nor actively selected for movement by the user (e.g., via tool 510), may nevertheless have been passively moved along canvas 301. This movement may vary in accordance with whatever physical attributes and integration schemes are employed by polygonal modeling module 214 and/or physical simulation integrating module 236 with respect to the polygonal mesh 215 of graphical object 420. It is to be understood that any suitable number of other screens may have been rendered and displayed by graphical display system 201 between screen 300e of FIG. 3E and screen 300g of FIG. 3G in order to present the animation of the graphical object 420 as it is being manipulated in accordance with the user's hit information 231 due to tool 510 and the user's movement information 241 due to user movement of tool 510 (e.g., along arrow M4).

The shape of surface 511 of tool 510 may be any suitable pre-defined shape or may be any suitable shape defined by a user such that the path of at least a portion of one typographical bound of a text string graphical object may be manipulated to match that shape (e.g., as at least a portion of descent 405 may have been manipulated to match the shape of surface 511 as shown in FIG. 3G). Additionally or alternatively, a tool 510 may be any other suitable shape and size such that a user may nudge or push or pull or expand or contract any one or more suitable portions of a text string graphical object or a drawing shape graphical object into any suitable manipulated shape. Such a tool may also be shaped and/or sized in any suitable way such that user may simultaneously activate and/or simultaneously move any particular subset of control points with a single tool and/or user input gesture.

In some embodiments, rather than a user selectively activating one or more control points for future movement, a user may select a constraint coupling two vertices represented by two control points, such that both control points may be considered activated, but the user may be provided with the ability to view a representation of such a constraint and actively move that constraint, and thus the vertices coupled thereto. Therefore, user hit information 231 may be indicative of one or more fixed or activated control segments, each of which may be coupled to two control points, which may similarly be fixed or activated. It is also to be understood that any user tool may be provided within a boundary of a graphical object and may be moved to manipulate the graphical object from within its boundary as opposed to from an external side of its boundary.

As yet another example, with reference to displayed text string graphical object 420, graphical display system 201 may limit the amount of vertices of a polygonal mesh that may be actively manipulated by a user (e.g., system 201 may limit the number of control points of a control point map that may be activated for movement in accordance with a particular user motion. For example, in some embodiments, only control points representative of vertices at end points of a text string may be rendered as control points presented to a user on canvas 301 (e.g., left-most control point 426-L of the left-most baseline vertex of text string 420 and right-most control point 426-R of the right-most baseline vertex of text string 420 may be the only control points rendered visible to a user on canvas 301). This may allow a user to more easily conceptualize certain ways in which text string 420 may be manipulated without the clutter of many control points. For example, these end control points may allow the user to drag the text string from either end, for example, like a string of characters on a physical string (e.g., by displaying a smoothed representation of baseline 403 spanning between left-most control point 426-L and right-most control point 426-R). In such embodiments, for example, the length of each constraint of each intra-character polygon of each character of graphical object 420 may be rigid and maintained at its initial length shown in FIG. 3E, and each ascent constraint of each ascent inter-character polygon and/or each descent constraint of each descent inter-character polygon, or each inter-character angle constraints (e.g., inter-character angle constraints AA1 and/or DA1) of graphical object 420 may be not rigid but instead may be somewhat flexible between a defined minimum length/angle size and a defined maximum length/angle size.

Moreover, in some embodiments, additional control points may become rendered for presentation to a user on canvas 301 in response to a particular user input. For example, when a user provides an input at a particular position on canvas 301 (e.g., via hit information 231), one or more control points may be activated and, in some embodiments, rendered for display. For example, in response to a user input at a user position P1 of FIG. 3E, one or more control points 426 may be activated based on their distance from the user input position P1. Any threshold distance or distances may be used by system 201 to determine whether a control point may be activated in response to a user input at a particular position on canvas 301. For example, in some embodiments, only control points representative of baseline vertices within a particular distance of the user input position P1 may be activated (e.g., control points 426-A, 426-B, and 426-C of FIGS. 3E and 3H). Alternatively, rather than selectively activating one or more control points based on a threshold distance from a user input position, system 201 may be configured to activate a particular number of control points that are closest to the user input position (e.g., three baseline control points that are closest to user input position P1, such as control points 426-A, 426-B, and 426-C of FIGS. 3E and 3H). When activated, some or all of these control points may be rendered for display on canvas 301.

Figure 3H:
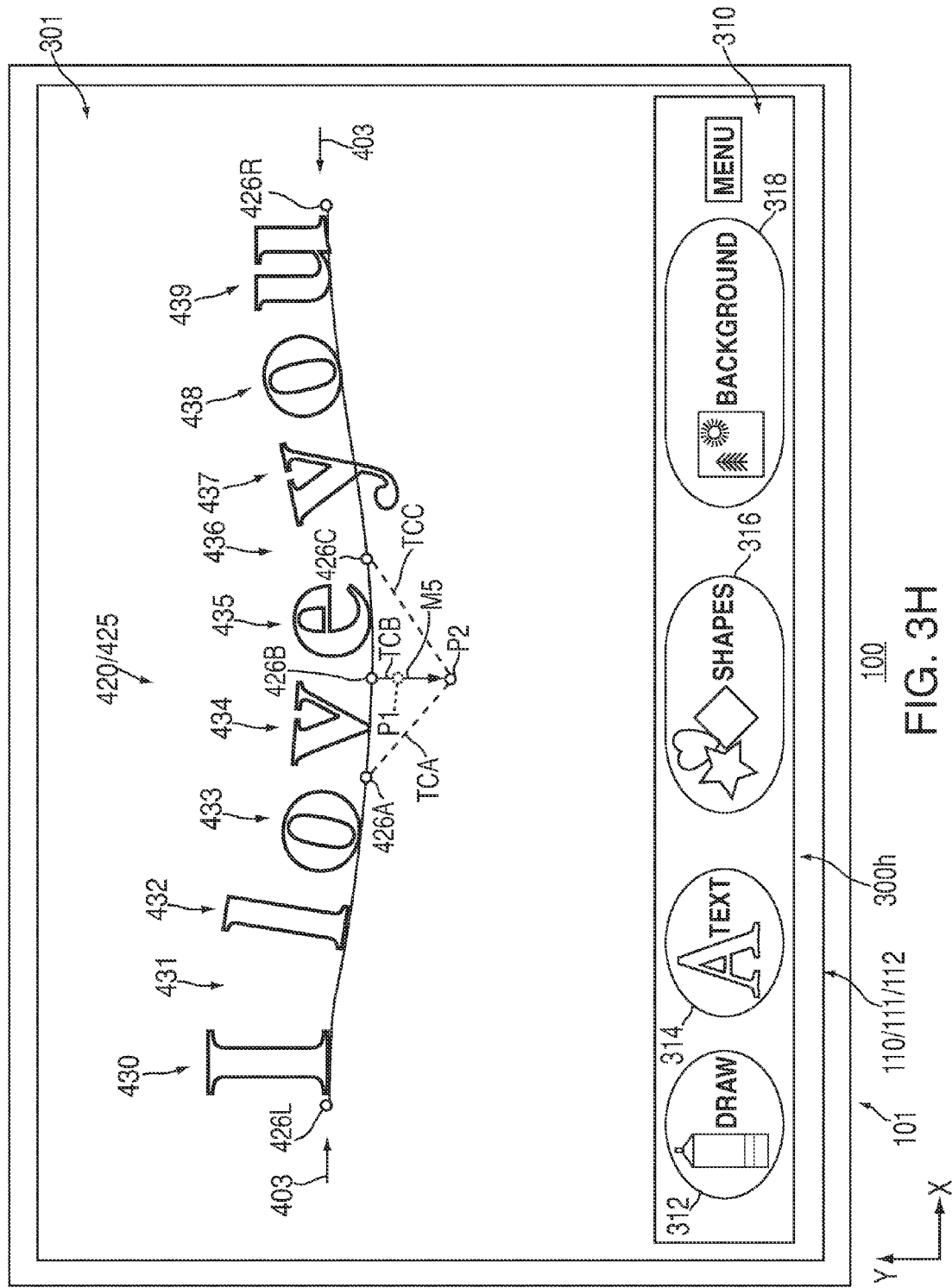

Once such one or more control points are activated, one or more temporary constraints may be modeled between a temporary vertex that may be modeled at the user input position P1 and each of the activated control points (e.g., to model temporary new constraint TCA between the temporary user input vertex and the vertex of activated baseline control point 426-A, temporary new constraint TCB between the temporary user input vertex and the vertex of activated baseline control point 426-B, and temporary new constraint TCC between the temporary user input vertex and the vertex of activated baseline control point 426-C, as shown in FIG. 3H). These temporary constraints may be configured to have any suitable attributes for modeling. For example, each temporary constraint may be flexible, such that a user motion (e.g., in the direction of arrow M5) from initial user input position P1 to a new user input position P2 may be distributed amongst the temporary constraints for actively moving each of the activated baseline control points, as shown in FIG. 3H. Therefore, such a user movement may be spread out amongst the newly activated control points via the temporary constraints. This may provide for easier user control of the manipulation of text string 420. The thresholds by which control points are activated with respect to a user input position as well as the attributes of any temporary constraints modeled and simulated between the activated control point vertices and a temporary user input vertex as the user input position is moved may be configured in various ways to provide the user with various amounts of control over the manipulation of the text string. Once a user completes a user movement and terminates a user input position gesture, the newly activated control points may be de-activated and the temporary vertices and constraints may be deleted while maintaining the rendered text string graphical object 420 at its newly manipulated state.

Figure 4:
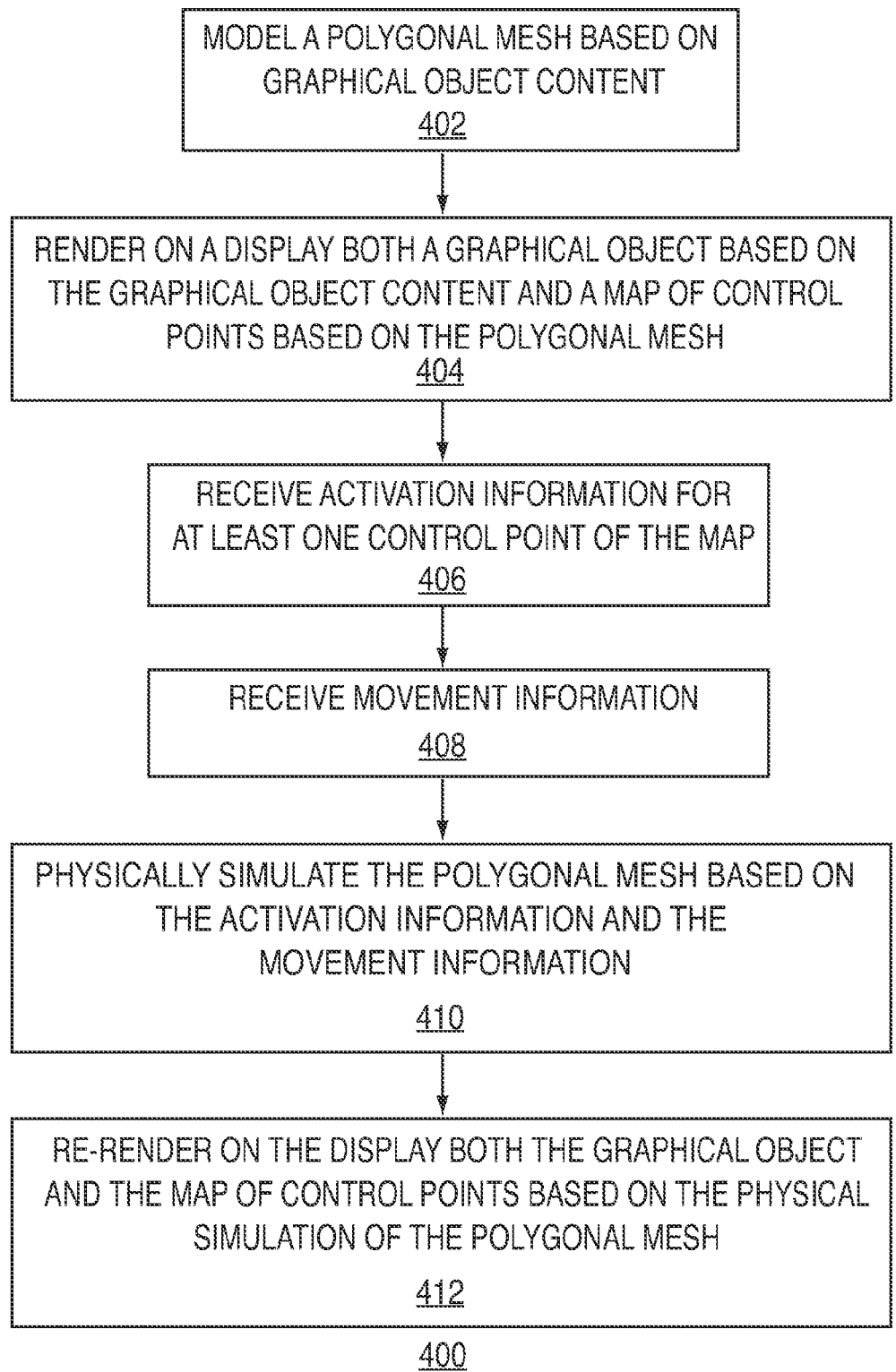
FIGS. 4-6 are flowcharts of illustrative processes for manipulating graphical date, in accordance with some embodiments of the invention.

FIG. 4 is a flowchart of an illustrative process 400 for manipulating graphical data. Process 400 may begin at step 402 by modeling a polygonal mesh based on graphical object content. For example, polygonal modeling module 214 may generate a polygonal mesh 215 based on graphical object content 213, which may be text string graphical object content (e.g., one or more character glyphs) or drawing shape graphical object content (e.g., a drawing shape boundary representation). Next, at step 404, process 400 may render on a display both a graphical object based on the graphical object content and a map of control points based on the polygonal mesh. Next, at step 406, activation information for at least one control point of the map may be received, and movement information may be received at step 408. For example, such activation information may be indicated by user hit information 231 received by hit detecting module 232, while such movement information may be indicated by user movement information 241 received by movement detecting module 234. Next, at step 410, the polygonal mesh may be physically simulated based on the activation information and the movement information. Then, at step 412, both the graphical object and the map of control points may be re-rendered on the display based on the physical simulation of the polygonal mesh.

In some embodiments, the polygonal mesh may include a first number of vertices, the control map may include a second number of control points, and each control point of the map may be associated with a respective vertex of the polygonal mesh. However, the second number may be at least one less than the first number, such that at least one vertex may not be associated with a control point of the map. In some embodiments, process 400 may also include receiving fixation information for at least one other control point of the map, and the physical simulation of step 410 may include physically simulating the polygonal mesh based on the activation information, the movement information, and the fixation information. This physical simulation may employ a Verlet integration scheme or any other suitable integration scheme. In some particular embodiments, the reception of activation information at step 406 may include receiving a first user touch gesture at a first position on the display that may be associated with the control point, and the reception of movement information at step 408 may include receiving a second user touch gesture that may move from the first position on the display to a second position on the display. Accordingly, in some embodiments, the physical simulation of step 410 and the re-rendering of step 412 may be continually repeated as the second user gesture moves on the display screen.

Figure 5:
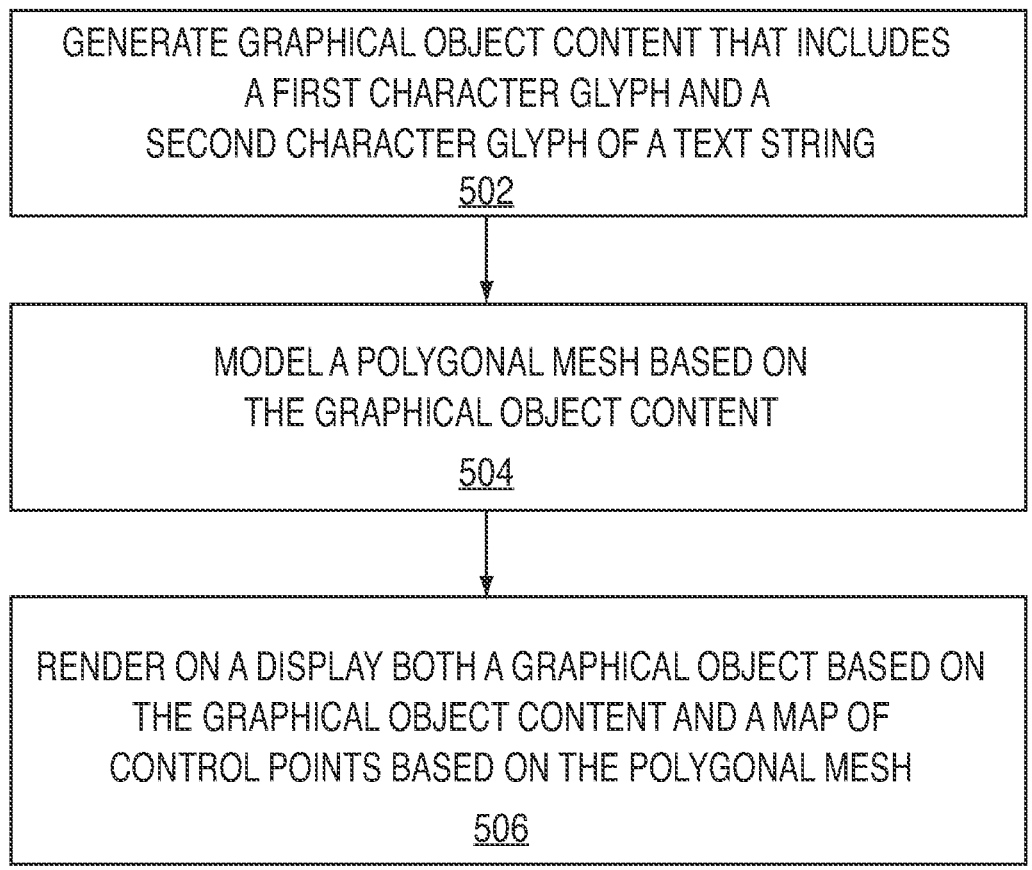

FIG. 5 is a flowchart of an illustrative process 500 for manipulating graphical data. Process 500 may begin at step 502 by generating graphical object content that includes a first character glyph and a second character glyph of a text string. Next, at step 504, a polygonal mesh may be modeled based on the graphical object content. Then, at step 506, both a graphical object based on the graphical object content and a map of control points based on the polygonal mesh may be rendered on a display.

In some embodiments, the modeling of step 504 may include generating a first intra-character polygon for the first character glyph, generating a second intra-character polygon for the second character glyph, and generating a first inter-character polygon between the first intra-character polygon and the second intra-character polygon. For example, the first intra-character polygon and the second intra-character polygon may share a common vertex, the first inner-character polygon and the first intra-character polygon may share two common vertices, while the first inner-character polygon and the second intra-character polygon share two common vertices. In other embodiments, the modeling of step 504 may include modeling the polygonal mesh with respect to a baseline typographical bound and an ascent typographical bound. For example, each intra-character polygon may include two baseline vertices and an ascent vertex, and one of the two baseline vertices of each of intra-character polygon may be a common baseline vertex to both intra-character polygons. Moreover, the first inner-character polygon may include the common baseline vertex of both intra-character polygons as well as the ascent vertex of each intra-character polygon. Each polygon may include a set of constraints, and each constraint of each intra-character polygon may be rigid, while a constraint of the first inner-character polygon may be non-rigid. In such embodiments, each polygon may include a set of vertices, a common vertex may be shared by the first intra-character polygon, the second intra-character polygon, and the first inner-character polygon, while the non-rigid constraint of the first inner-character polygon may prevent a constraint of the first intra-character polygon from overlapping with a constraint of the second intra-character polygon. The polygonal mesh may include multiple vertices and each vertex may be associated with a respective one of the control points.

Figure 6:
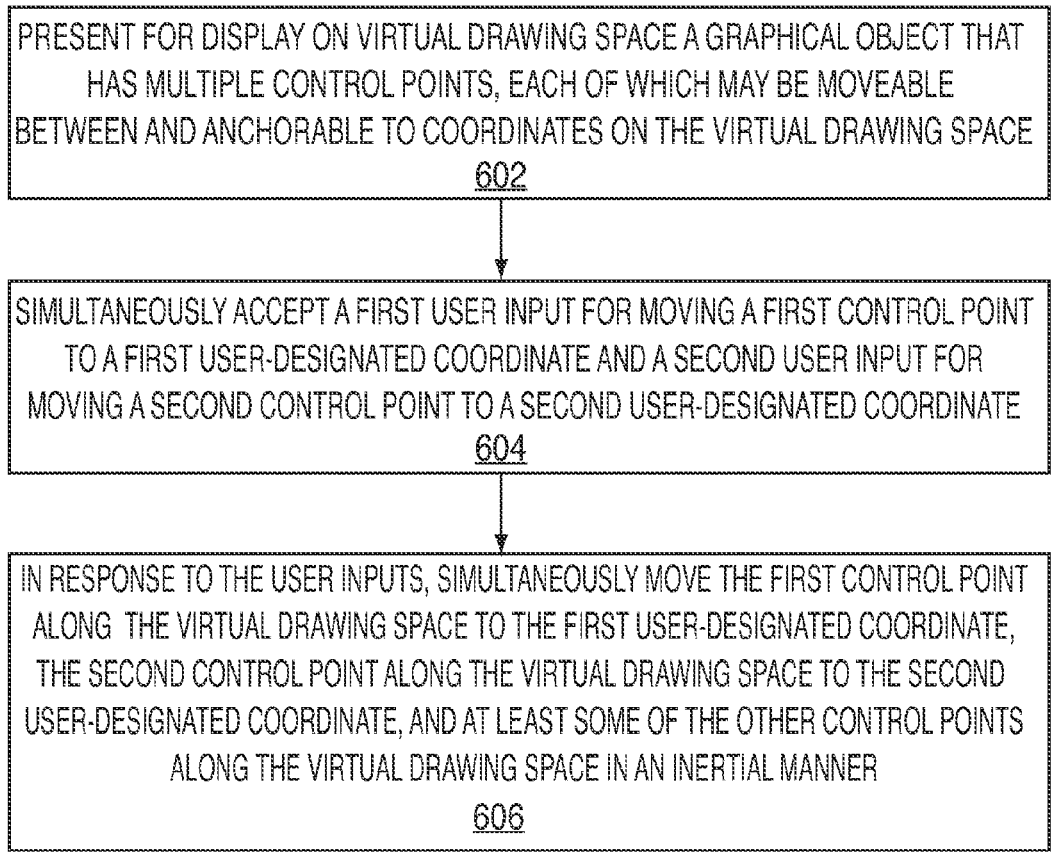

FIG. 6 is a flowchart of an illustrative process 600, which may begin at step 602 by presenting for display on a virtual drawing space a graphical object that includes multiple control points, each of which may be moveable between and anchorable to coordinates on the virtual drawing space. Next, at step 604, a first user input for moving a first control point to a first user-designated coordinate and a second user input for moving a second control point to a second user-designated coordinate may be accepted simultaneously. Then, at step 606, in response to the user inputs, process 600 may simultaneously move the first control point along the virtual drawing space to the first user-designated coordinate, the second control point along the virtual drawing space to the second user-designated coordinate, and at least some of the other control points along the virtual drawing space in an inertial manner. For example, the first user input and the second user input may be simultaneously received from a multi-touch input component. In some embodiments, the first user input and the second user input may be simultaneously received by moving a virtual user input tool along the virtual drawing space in a single direction. In some embodiments, process 600 may also include anchoring the first control point at the first user-designated coordinate.

It is to be understood that the steps shown in each one of processes 400, 500, and 600 of FIGS. 4, 5, and 6, respectively, are merely illustrative and that existing steps may be modified or omitted, additional steps may be added, and the order of certain steps may be altered.

Moreover, the processes described with respect to FIGS. 4-6, as well as any other aspects of the invention, may each be implemented by software, but may also be implemented in hardware, firmware, or any combination of software, hardware, and firmware. They each may also be embodied as computer-readable code recorded on a computer-readable medium. The computer-readable medium may be any data storage device that can store data which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 of FIG. 1). The computer-readable medium can also be distributed over network-coupled computer systems so that the computer readable code is stored and executed in a distributed fashion.

It is to be understood that each module of graphical display system 201 may be provided as a software construct, firmware construct, one or more hardware components, or a combination thereof. It is also to be understood that the number, configuration, and interconnection of the modules of graphical display system 201 are merely illustrative and that existing modules may be modified or omitted, additional modules may be added, and the interconnection of certain modules may be altered. Each module of system 201 may be implemented using any suitable technologies (e.g., as one or more integrated circuit devices), and different modules may or may not be identical in structure, capabilities, and operation. Any or all of the modules or other components of system 201 may be mounted on an expansion card, mounted directly on a system motherboard, or integrated into a system chipset component (e.g., into a "north bridge" chip). System 201 may include any amount of dedicated graphics memory, may include no dedicated graphics memory and may rely on device memory 104 of device 100, or may use any combination thereof.

Graphical display system 201 may be a dedicated system implemented using one or more expansion cards adapted for various bus standards. For example, all of the modules may be mounted on different interconnected expansion cards or all of the modules may be mounted on one expansion card. The modules of system 201 may interface with a motherboard or processor 102 of device 100 through an expansion slot (e.g., a peripheral component interconnect ("PCI") slot or a PCI express slot). Alternatively, system 201 need not be removable but may include one or more dedicated modules that may include memory (e.g., RAM) dedicated to the utilization of the module. In other embodiments, system 201 may be a graphics system integrated into device 100. For example, a module of system 201 may utilize a portion of device memory 104 of device 100. One or more of the modules of graphical display system 201 may include its own processing circuitry and/or memory. Alternatively each module of graphical display system 201 may share processing circuitry and/or memory with any other module of graphical display system 201 and/or processor 102 and/or memory 104 of device 100.

As mentioned, an input component 110 of device 100 may include a touch input component that can receive touch input for interacting with other components of device 100 via wired or wireless bus 114. Such a touch input component 110 may be used to provide user input to device 100 in lieu of or in combination with other input components, such as a keyboard, mouse, and the like. One or more touch input components may be used for providing user input to device 100.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard), or any multi-dimensional object having a touch sensitive surface for receiving touch input.

In some embodiments, a touch input component 110 embodied as a touch screen may include a transparent and/or semitransparent touch sensitive panel partially or wholly positioned over at least a portion of a display (e.g., display 112). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, twisting, changing orientation, pressing with varying pressure, and the like at essentially the same time, contiguously, or consecutively. A gesture may be characterized by, but is not limited to, a pinching, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display 112) with graphical data to display a graphical user interface ("GUI"). The GUI may be configured to receive touch input via a touch input component 110. Embodied as a touch screen (e.g., with display 112 as I/O component 111), touch I/O component 111 may display the GUI. Alternatively, the GUI may be displayed on a display (e.g., display 112) separate from touch input component 110. The GUI may include graphical elements displayed at particular locations within the interface. Graphical elements may include, but are not limited to, a variety of displayed virtual input devices, including virtual scroll wheels, a virtual keyboard, virtual knobs, virtual buttons, any virtual UI, and the like. A user may perform gestures at one or more particular locations on touch input component 110, which may be associated with the graphical elements of the GUI. In other embodiments, the user may perform gestures at one or more locations that are independent of the locations of graphical elements of the GUI. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen.

Feedback may be provided to the user via bus 114 in response to or based on the touch or near touches on a touch input component 110. Feedback may be transmitted optically, mechanically, electrically, olfactory, acoustically, or the like or any combination thereof and in a variable or non-variable manner.

As also mentioned, one or more Application Programming Interfaces ("APIs") may be used in some embodiments (e.g., with respect to polygonal modeling module 214 or any other suitable module or any other suitable portion of any suitable module of graphical display system 201 of FIG. 2). An API may be an interface implemented by a program code component or hardware component (hereinafter "API-implementing component") that may allow a different program code component or hardware component (hereinafter "API-calling component") to access and use one or more functions, methods, procedures, data structures, classes, and/or other services provided by the API-implementing component. An API can define one or more parameters that may be passed between the API-calling component and the API-implementing component.

An API may allow a developer of an API-calling component, which may be a third party developer, to leverage specified features provided by an API-implementing component. There may be one API-calling component or there may be more than one such component. An API can be a source code interface that a computer system or program library may provide in order to support requests for services from an application. An operating system ("OS") can have multiple APIs to allow applications running on the OS to call one or more of those APIs, and a service (e.g., a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (e.g., not exposed) and can provide a subset of the first set of functions and can also provide another set of functions, such as testing or debugging functions which are not in the first set of functions. In other embodiments, the API-implementing component may itself call one or more other components via an underlying API and may thus be both an API-calling component and an API-implementing component.

An API may define the language and parameters that API-calling components may use when accessing and using specified features of the API-implementing component. For example, an API-calling component may access the specified features of the API-implementing component through one or more API calls or invocations (e.g., embodied by function or method calls) exposed by the API and may pass data and control information using parameters via the API calls or invocations. The API-implementing component may return a value through the API in response to an API call from an API-calling component. While the API may defines the syntax and result of an API call (e.g., how to invoke the API call and what the API call does), the API may not reveal how the API call accomplishes the function specified by the API call. Various API calls may be transferred via the one or more application programming interfaces between the calling component (e.g., API-calling component) and an API-implementing component. Transferring the API calls may include issuing, initiating, invoking, calling, receiving, returning, or responding to the function calls or messages. Thus, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list, or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit ("SDK") library. In other embodiments, an application or other client program may use an API provided by an Application Framework. In such embodiments, the application or client program may incorporate calls to functions or methods provided by the SDK and provided by the API or may use data types or objects defined in the SDK and provided by the API. An Application Framework may, in these embodiments, provide a main event loop for a program that responds to various events defined by the Framework. The API may allow the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, and the like, and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that may communicate with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component, such that the API may include features for translating calls and returns between the API-implementing component and the API-calling component. However, the API may be implemented in terms of a specific programming language. An API-calling component can, in some embodiments, call APIs from different providers, such as a set of APIs from an OS provider and another set of APIs from a plug-in provider and another set of APIs from another provider (e.g., the provider of a software library) or creator of the another set of APIs.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for manipulating graphical data comprising:
modeling a polygonal mesh based on graphical object content;
rendering on a display both a graphical object based on the graphical object content and a map of control points based on the polygonal mesh;
receiving activation information for at least one control point of the map;
receiving movement information;
physically simulating the polygonal mesh based on the activation information and the movement information; and
re-rendering on the display both the graphical object and the map of control points based on the physical simulation of the polygonal mesh.

2. The method of claim 1, wherein:
the polygonal mesh comprises a first number of vertices;
the control map comprises a second number of control points; and
each control point of the map is associated with a respective vertex of the polygonal mesh.

3. The method of claim 2, wherein the second number is at least one less than the first number.

4. The method of claim 1, further comprising receiving fixation information for at least one other control point of the map,
wherein the physically simulating comprises physically simulating the polygonal mesh based on the activation information, the movement information, and the fixation information.

5. The method of claim 1, wherein the physically simulating comprises employing a Verlet integration scheme.

6. The method of claim 1, wherein the receiving the activation information comprises receiving a first user touch gesture at a first position on the display associated with the at least one control point.

7. The method of claim 6, wherein the receiving the movement information comprises receiving a second user touch gesture that moves from the first position on the display to a second position on the display.

8. The method of claim 7, wherein the physically simulating and the re-rendering are continually repeated as the second user gesture moves on the display screen.

9. The method of claim 1, wherein the graphical object content comprises a first character glyph and a second character glyph of a text string.

10. The method of claim 1, wherein the graphical object content comprises a boundary of a drawing shape.

11. A method for manipulating graphical data comprising:
generating graphical object content that comprises a first character glyph and a second character glyph of a text string;
modeling a polygonal mesh based on the graphical object content;
rendering on a display both a graphical object based on the graphical object content and a map of control points based on the polygonal mesh;
receiving activation information for at least one control point of the map;
receiving movement information;
physically simulating the polygonal mesh based on the activation information and the movement information; and
re-rendering on the display both the graphical object and the map of control points based on the physical simulation of the polygonal mesh.

12. The method of claim 11, wherein the modeling comprises:
generating a first intra-character polygon for the first character glyph;
generating a second intra-character polygon for the second character glyph; and
generating a first inter-character polygon between the first intra-character polygon and the second intra-character polygon.

13. The method of claim 12, wherein:
the first intra-character polygon and the second intra-character polygon share a common vertex;
the first inner-character polygon and the first intra-character polygon share two common vertices; and
the first inner-character polygon and the second intra-character polygon share two common vertices.

14. The method of claim 12, wherein the modeling further comprises modeling the polygonal mesh with respect to a baseline typographical bound and an ascent typographical bound.

15. The method of claim 14, wherein:
each intra-character polygon comprises two baseline vertices and an ascent vertex; and
one of the two baseline vertices of each of intra-character polygon is a common baseline vertex to both intra-character polygons.

16. The method of claim 15, wherein the first inner-character polygon comprises:
the common baseline vertex of both intra-character polygons; and
the ascent vertex of each intracharacter polygon.

17. The method of claim 12, wherein:
each polygon comprises a set of constraints;
each constraint of each intra-character polygon is rigid; and
a constraint of the first innercharacter polygon is not rigid.

18. The method of claim 17, wherein:
each polygon further comprises a set of vertices;
a common vertex is shared by the first intra-character polygon, the second intra-character polygon, and the first inner-character polygon; and
the non-rigid constraint of the first inner-character polygon prevents a constraint of the first intra-character polygon from overlapping with a constraint of the second intra-character polygon.

19. The method of claim 11, wherein:
the polygonal mesh comprises a plurality of vertices; and
each vertex is associated with a respective one of the control points.

20. A method comprising:
presenting, by a computer system, a graphical object for display on a virtual drawing space, wherein the graphical object has a plurality of control points, each of which is moveable between and anchorable to coordinates on the virtual drawing space, wherein the control points are control points of a polygon mesh corresponding to the graphical object;
simultaneously accepting, by the computer system, a first user input for moving a first control point of the plurality of control points to a first user-designated coordinate and a second user input for moving a second control point of the plurality of control points to a second user-designated coordinate; and
moving simultaneously, by the computer system in response to the user inputs, the first control point along the virtual drawing space to the first user-designated coordinate, the second control point along the virtual drawing space to the second user-designated coordinate, and at least some of the other control points along the virtual drawing space in an inertial manner.

21. The method of claim 20, further comprising anchoring the first control point at the first user-designated coordinate.

22. The method of claim 20, wherein the simultaneously accepting comprises accepting the first user input and the second user input from a multi-touch input component.

23. The method of claim 20, wherein the simultaneously accepting comprises moving a virtual user input tool along the virtual drawing space in a single direction.

24. A graphical display system comprising:
a polygonal modeling module that generates a collection of polygons based on graphical object content;
a rendering module that renders a graphical object on a display based on the graphical object content and that renders at least two control points on the display based on the collection of polygons;
a hit detecting module that receives activation information for each of the at least two control points;
a movement detecting module that receives movement information; and
a physical simulation integrating module that physically simulates the collection of polygons based on the activation information and the movement information.

25. The system of claim 24, further comprising a re-rendering module that re-renders the graphical object and the at least two control points based on the physically simulated collection of polygons.

26. The system of claim 24 further comprising a multi-touch input component, wherein the hit detecting module simultaneously receives the activation information for each of the at least two control points from the multi-touch input component.

27. The system of claim 26, wherein the movement detecting module receives the movement information from the multi-touch input component.

28. The system of claim 24, wherein the graphical object content comprises a first character glyph and a second character glyph of a text string.

29. The system of claim 24, wherein the graphical object content comprises a boundary of a drawing shape.

30. A non-transitory computer-readable medium on which is stored instructions comprising instructions, that when executed by an electronic device, cause the electronic device to:
  generate graphical object content that comprises a first character glyph and a second character glyph of a text string;
  model a polygonal mesh based on the graphical object content by:
    generating a first intra-character polygon for the first character glyph;
    generating a second intra-character polygon for the second character glyph; and
    generating a first inter-character polygon between the first intra-character polygon and the second intra-character polygon; and
  render on a display both a graphical object based on the graphical object content and a map of control points based on the polygonal mesh.

31. The computer-readable medium of claim 30, wherein:
  each polygon comprises at least three vertices; and
  wherein each control point is associated with a respective vertex.

* * * * *

UNITED STATES PATENT AND TRADEMARK OFFICE
CERTIFICATE OF CORRECTION

PATENT NO. : 8,610,714 B2  
APPLICATION NO. : 12/907810  
DATED : December 17, 2013  
INVENTOR(S) : Conrad R. Carlen et al.

Page 1 of 1

It is certified that error appears in the above-identified patent and that said Letters Patent is hereby corrected as shown below:

In the Claims:

Col. 45, line 51, (Claim 13, line 6), change "inner-character" to --inter-character--.

Col. 45, line 63, (Claim 16, line 1), change "inner-character" to --inter-character--.

Col. 45, line 67, (Claim 16, line 5), change "intracharacter" to --intra-character--.

Col. 46, line 5, (Claim 17, line 5), change "innercharacter" to --inter-character--.

Col. 46, line 10, (Claim 18, line 5), change "inner-character" to --inter-character--.

Col. 46, line 11, (Claim 18, line 6), change "inner-character" to --inter-character--.

Col. 46, line 25, (Claim 20, line 7), change "polygon" to --polygonal--.

Signed and Sealed this  
Eighteenth Day of February, 2014

Michelle K. Lee  
*Deputy Director of the United States Patent and Trademark Office*